March 6, 1962 E. J. SCHMITT ET AL 3,023,963

DIGITAL COMPUTING SYSTEMS

Filed Dec. 28, 1954 7 Sheets-Sheet 1

INVENTORS
EDWARD J. SCHMITT
JAMES G. SMITH
BY Morris L. Rabkin
ATTORNEY

INVENTORS
EDWARD J. SCHMITT &
JAMES G. SMITH
BY Morris A. Rabkin
ATTORNEY

DIGITAL COMPUTING SYSTEMS

Filed Dec. 28, 1954 7 Sheets-Sheet 3

INVENTORS
EDWARD J. SCHMITT
BY & JAMES G. SMITH
Morris L. Rabkin
ATTORNEY

March 6, 1962 E. J. SCHMITT ET AL 3,023,963

DIGITAL COMPUTING SYSTEMS

Filed Dec. 28, 1954 7 Sheets-Sheet 4

INVENTORS
EDWARD J. SCHMITT
BY JAMES G. SMITH
Morris Rabkin
ATTORNEY

DIGITAL COMPUTING SYSTEMS

Filed Dec. 28, 1954

INVENTORS
EDWARD J. SCHMITT &
BY JAMES G. SMITH
Morris A. Rabkin
ATTORNEY

INVENTORS
EDWARD J. SCHMITT
BY & JAMES G. SMITH
Morris A. Rabkin
ATTORNEY

INVENTORS
EDWARD J. SCHMITT
BY & JAMES G. SMITH
Morris A. Robkin
ATTORNEY 3,023,963

DIGITAL COMPUTING SYSTEMS

Edward J. Schmitt, Collingswood, and James G. Smith, Haddonfield, N.J., assignors to Radio Corporation of America, a corporation of Delaware Filed Dec. 28, 1954, Ser. No. 477,975
17 Claims. (Cl. 235—176)

Figure 1:
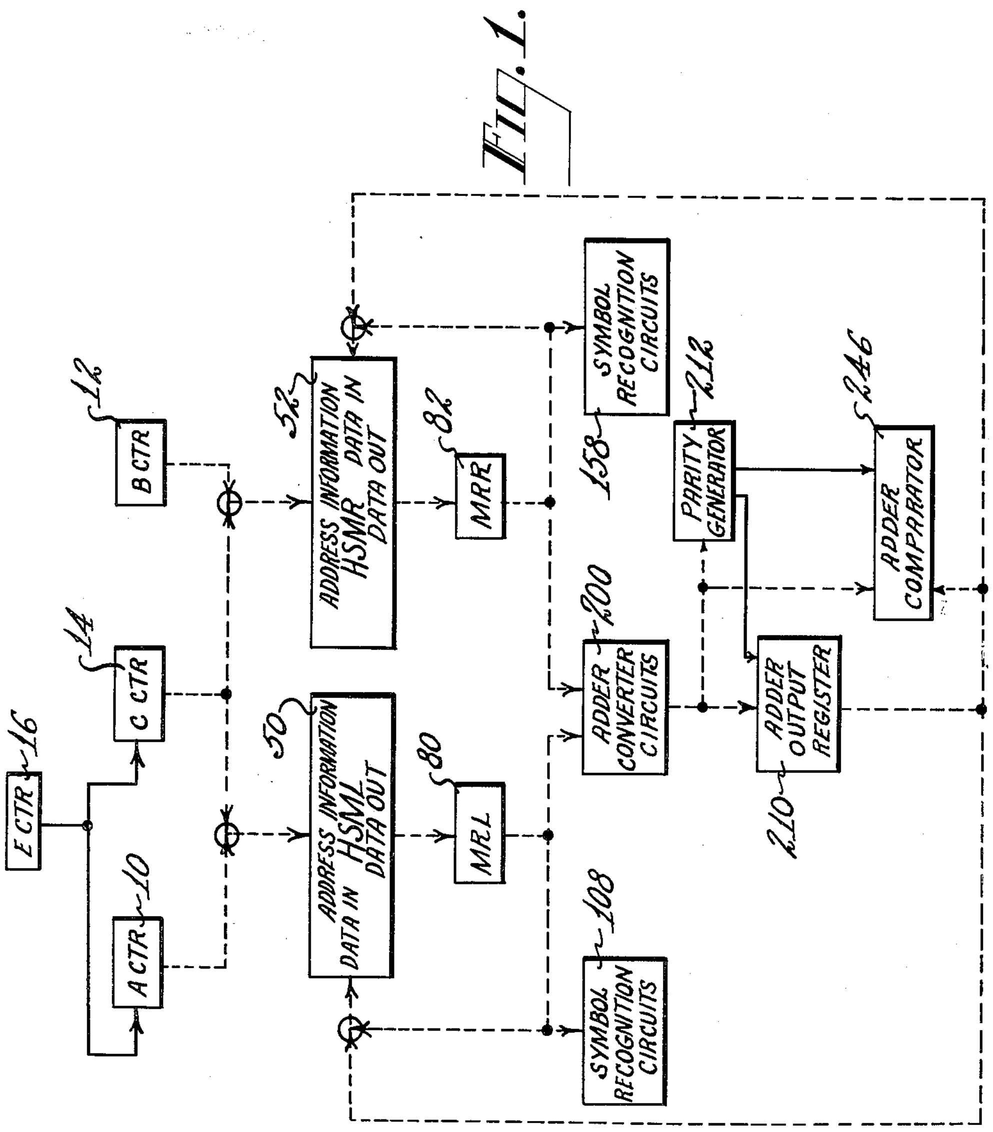

This invention relates to digital computing systems, and particularly to a system for addition and subtraction.

Digital computing machines have employed information coding systems which are particularly advantageous for scientific calculations. Presently, however, digital computing techniques and systems are becoming widely employed in other applications, such as in work of essentially commercial nature. Thus computing systems are being constructed to provide greater flexibility in representing and manipulating information of all kinds.

Among the coding forms used in digital computers are alpha-numeric codes. In one type of alpha-numeric code, each decimal digit from 0 to 9 may be represented by a binary number, and each desired character and special symbol may be assigned a different binary number. In such a code, a multi-digit decimal number is represented by a sequence, or train, of binary numbers instead of a pure binary number. Thus, this form of coding is often called a binary-coded decimal system.

Commercial installations require the storage and manipulation of great masses of information. Ready access to and economical storage of such information is largely dependent upon the compactness with which such information can be stored. In the prior art, each basic grouping of information, such as a word (also called an item), was allotted a predetermined number of character positions, each unused position being filled with a space. Use of such standard word lengths, however, usually meant that the standard length adopted had to be the length of the maximum expected item and that a great deal of waste storage space might result. For greater compactness in storing information, therefore, a coding system has been evolved in which each basic information grouping is separated from others by significant symbols or combinations. This system may be said to use items of variable, non-standard maximum length. The items are called non-standard because the maximum item length may be different for different items. The items are called variable because each item may assume any number of places not exceeding the maximum allotted to it.

The use of variable, non-standard maximum length items may in turn create added problems in the processing of the information in a computing system. A system operating on such items should detect the length of an item and correctly provide for length relationships.

A system for adding and subtracting variable, non-standard length items is described in an application for patent entitled "Digital Computing Systems," filed concurrently herewith, by Lowell S. Bensky and Ivan H. Sublette, Serial No. 478,098.

The system in the above-identified application is described with reference to a coding scheme in which the four least significant digits of a binary number represent the decimal equivalent of the number. Also, the coding scheme employed therein has special symbols, denoting the sense of a quantity, adjacent the most significant character of the quantity.

An object of this invention is to provide an improved addition and subtraction system for quantities represented in an alpha-numeric code.

Another object of this invention is to provide an improved adder and subtracter, which adder and subtracter operates automatically without special programming.

Another object of this invention is to automatically add or subtract quantities encoded as variable, non-standard maximum length items.

Yet another object is to automatically add and subtract variable, non-standard maximum length items in which the signs of the items are placed adjacent the least significant characters.

A further object is to automatically add and subtract quantities simply and efficiently at a high rate of speed with an improved system which may operate in conjunction with an information handling system having a timed and sequential operation.

In accordance with the invention, an arrangement is provided which operates on binary-coded decimal information in an excess three code. The sign of each operand is placed adjacent the least significant character of the operand. The signs of the operands are recognized and operated on first. A provisional minus result is assumed where the sign of the result is dependent upon the values of the operands. Characters from the two operands are then successively added or subtracted, starting with the least significant characters. Result characters, together with possible carry signals, are provided from each addition or subtraction. The result characters are stored in sequence in a memory, each carry signal being employed in the addition or subtraction of the next pair of characters. The ends of the operands are detected and may be employed to terminate an operation, to initiate an end-around-carry sequence, or to change the provisional result.

Each operation is carried out in a timed sequence having a number of operative steps. Separate steps, such as complementing and end-around-carry, may be undertaken or omitted, as required by circumstances.

Figure 3:
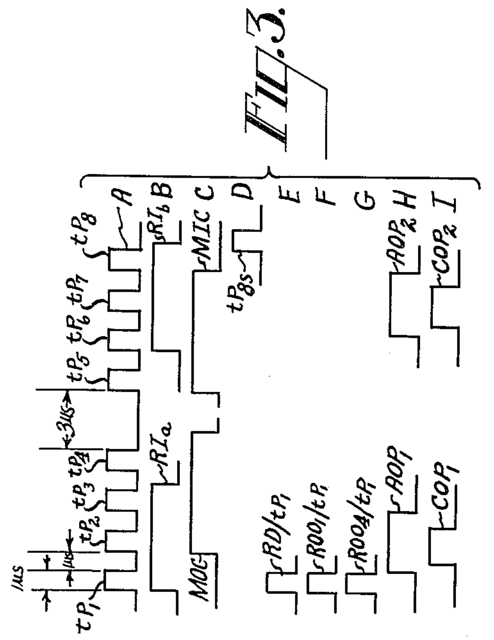
Figure 5:
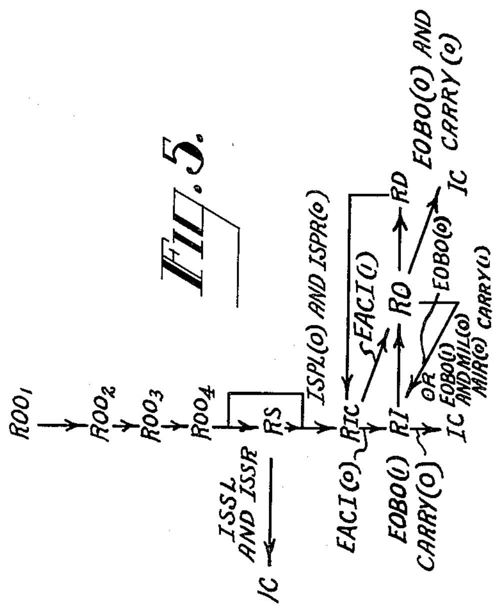
Figure 2:
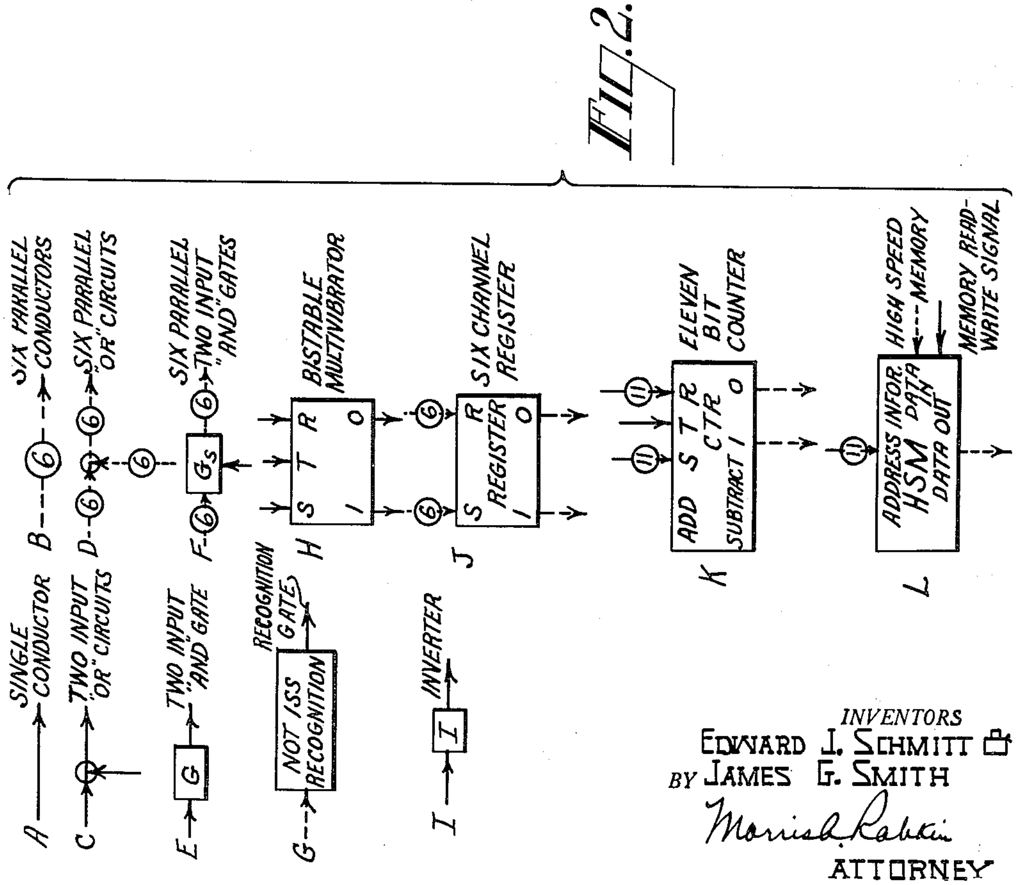
Figure 4:
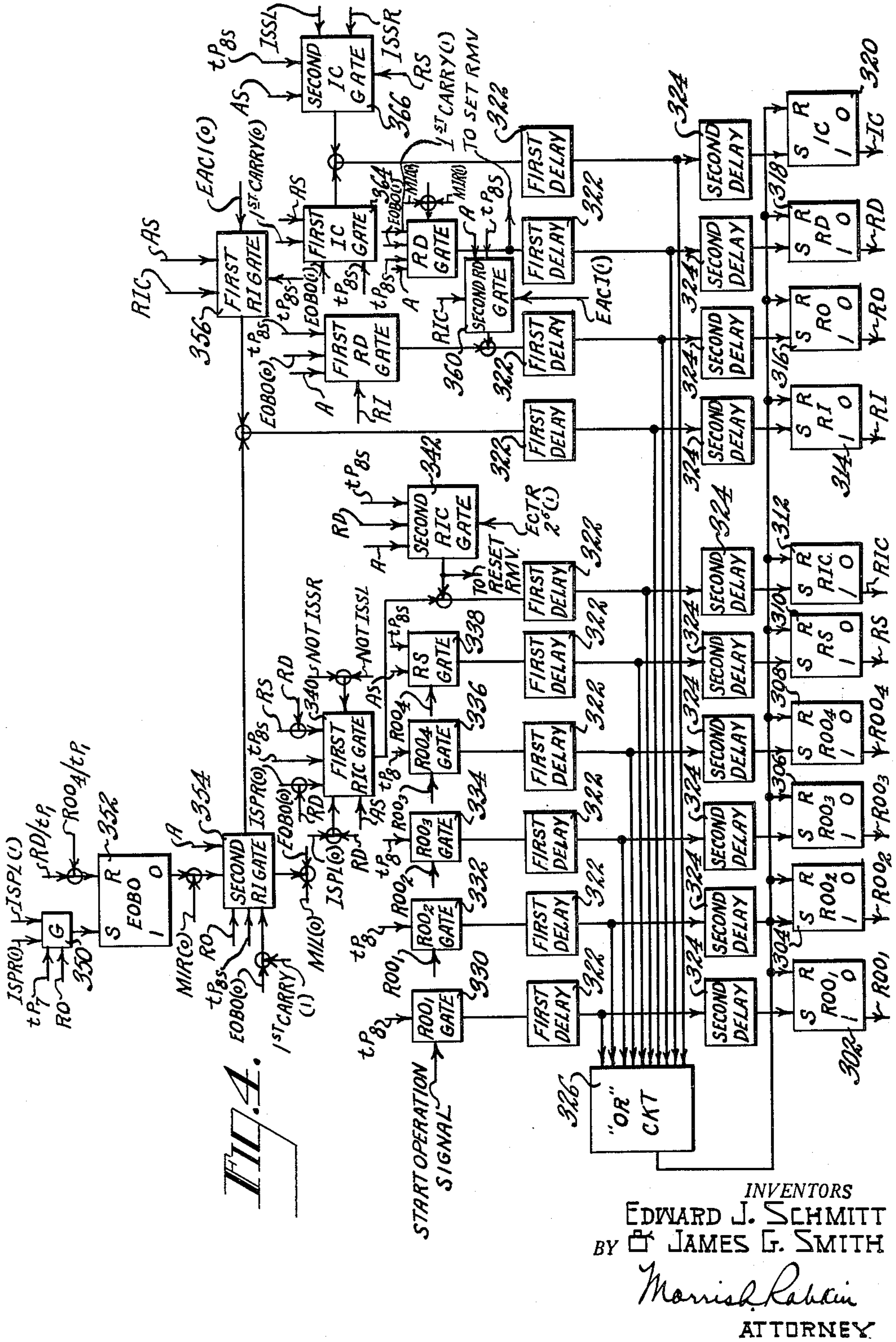
Figure 6A:
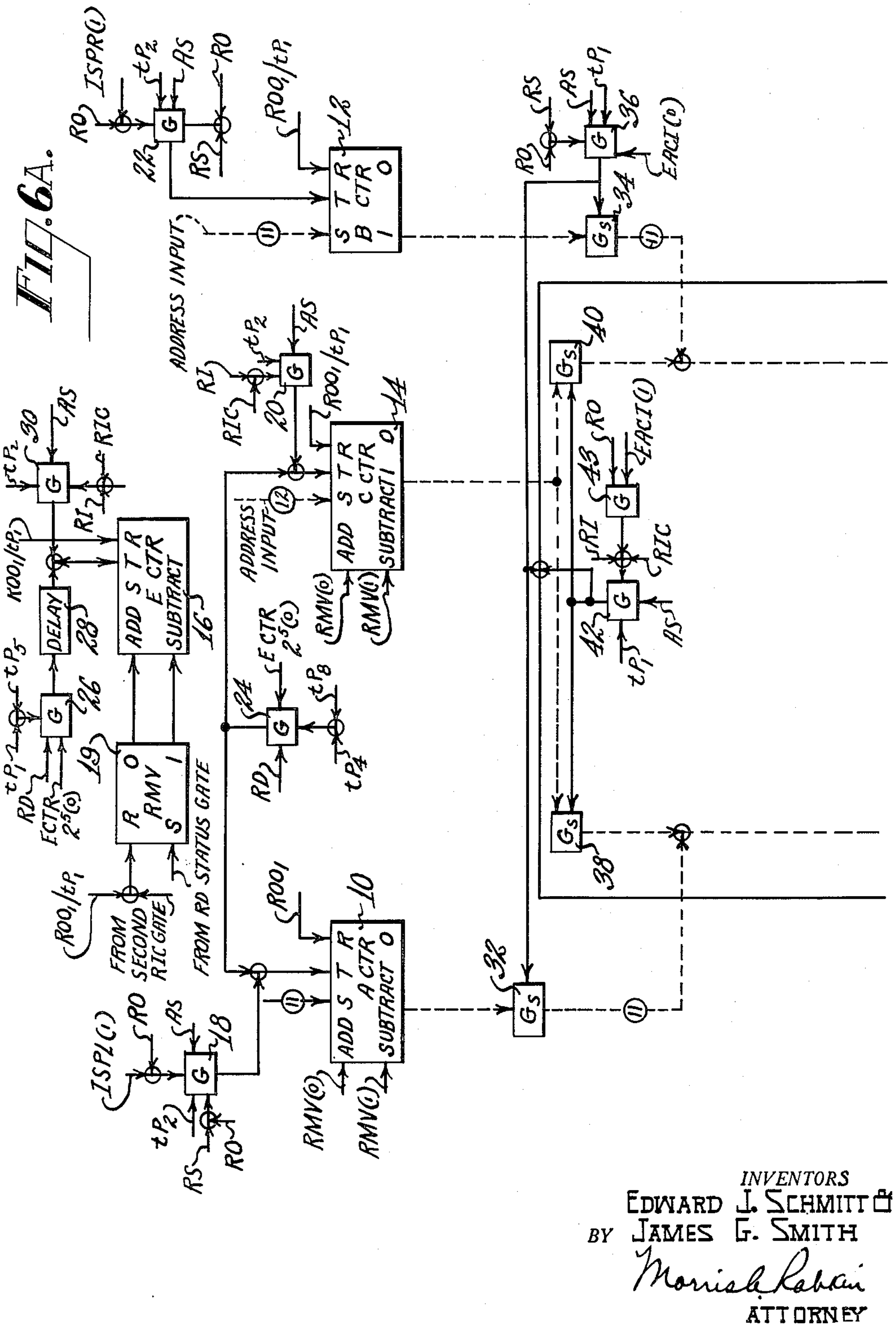
Figure 6B:
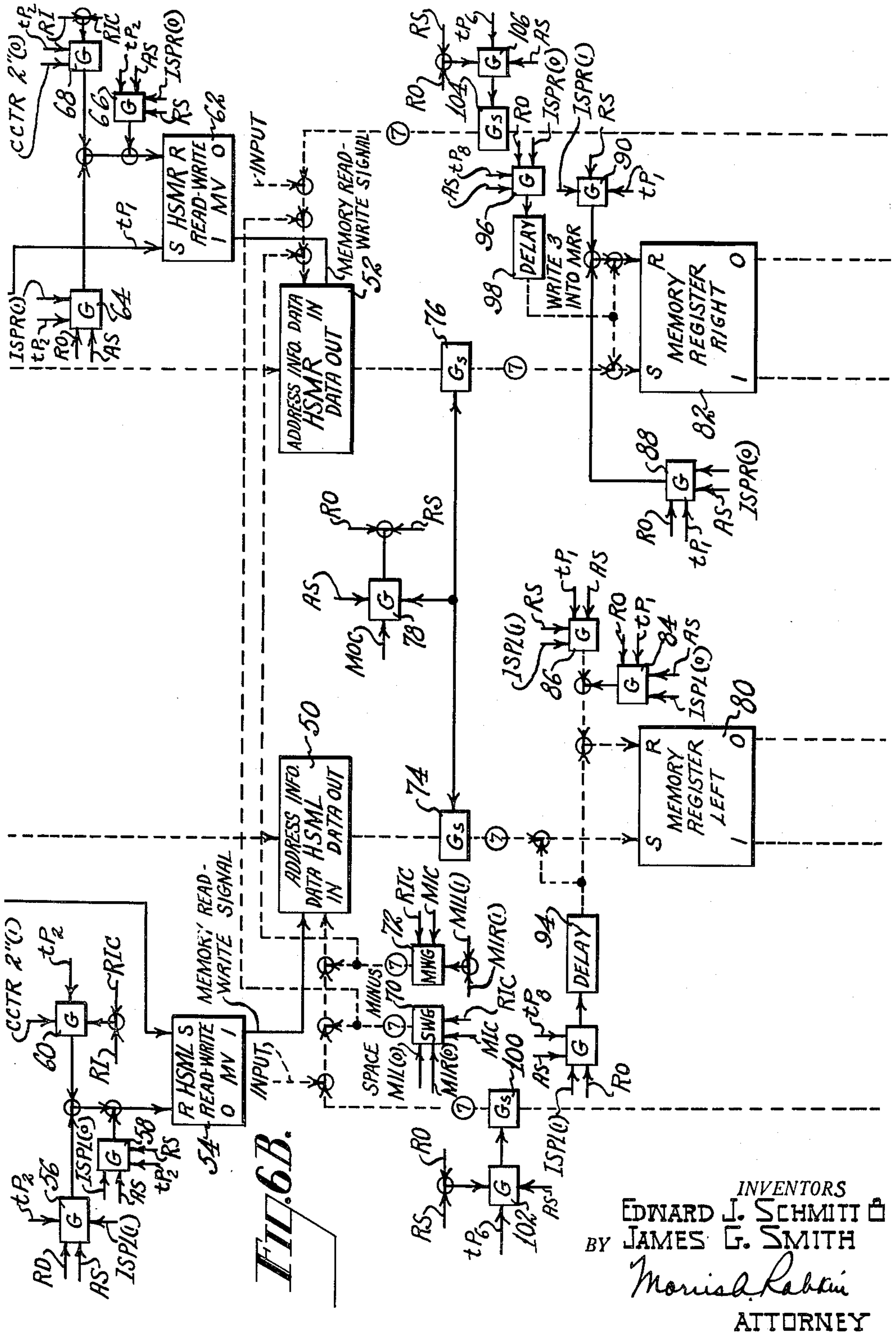
Figure 6C:
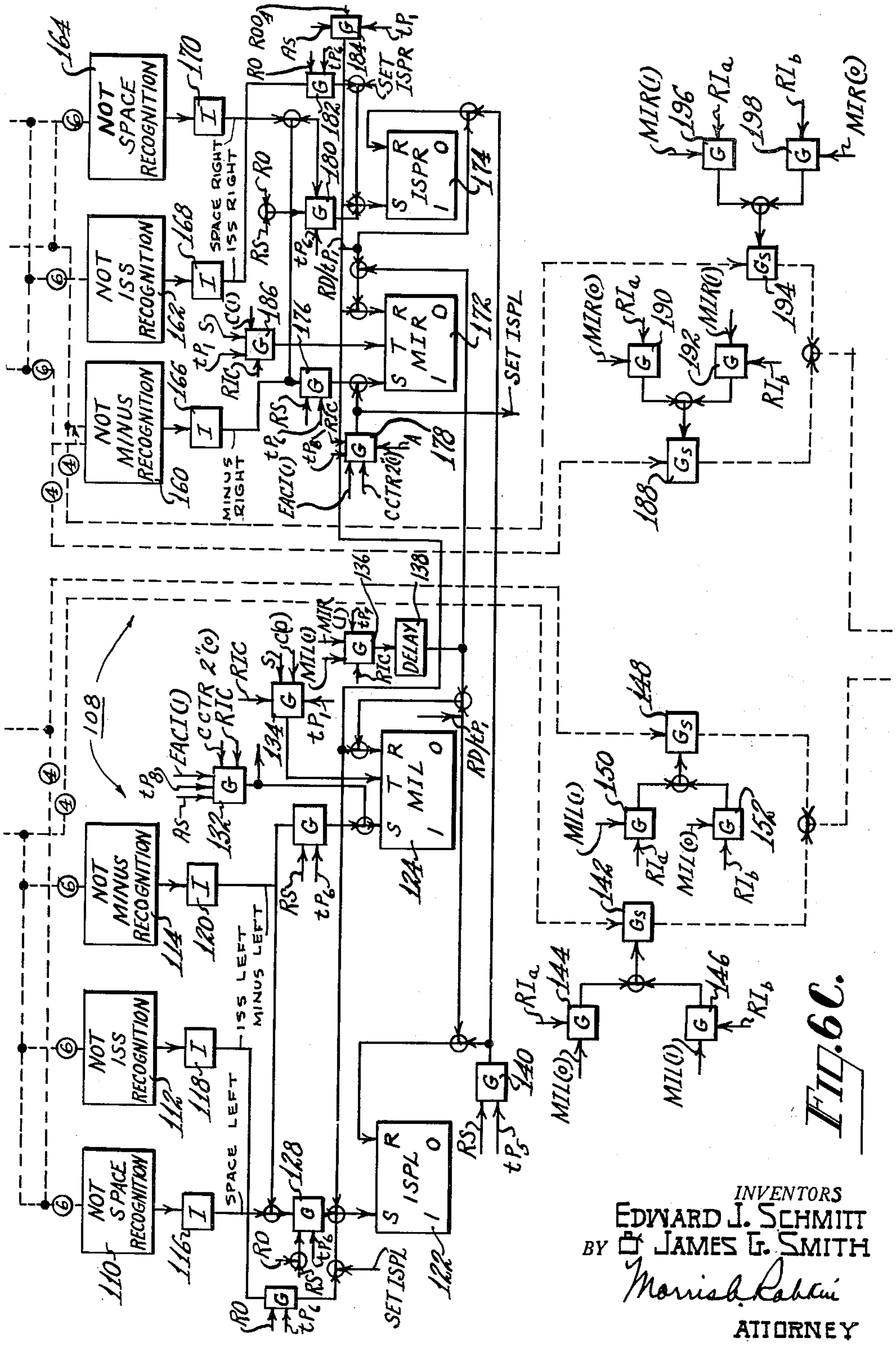
Figure 6D:
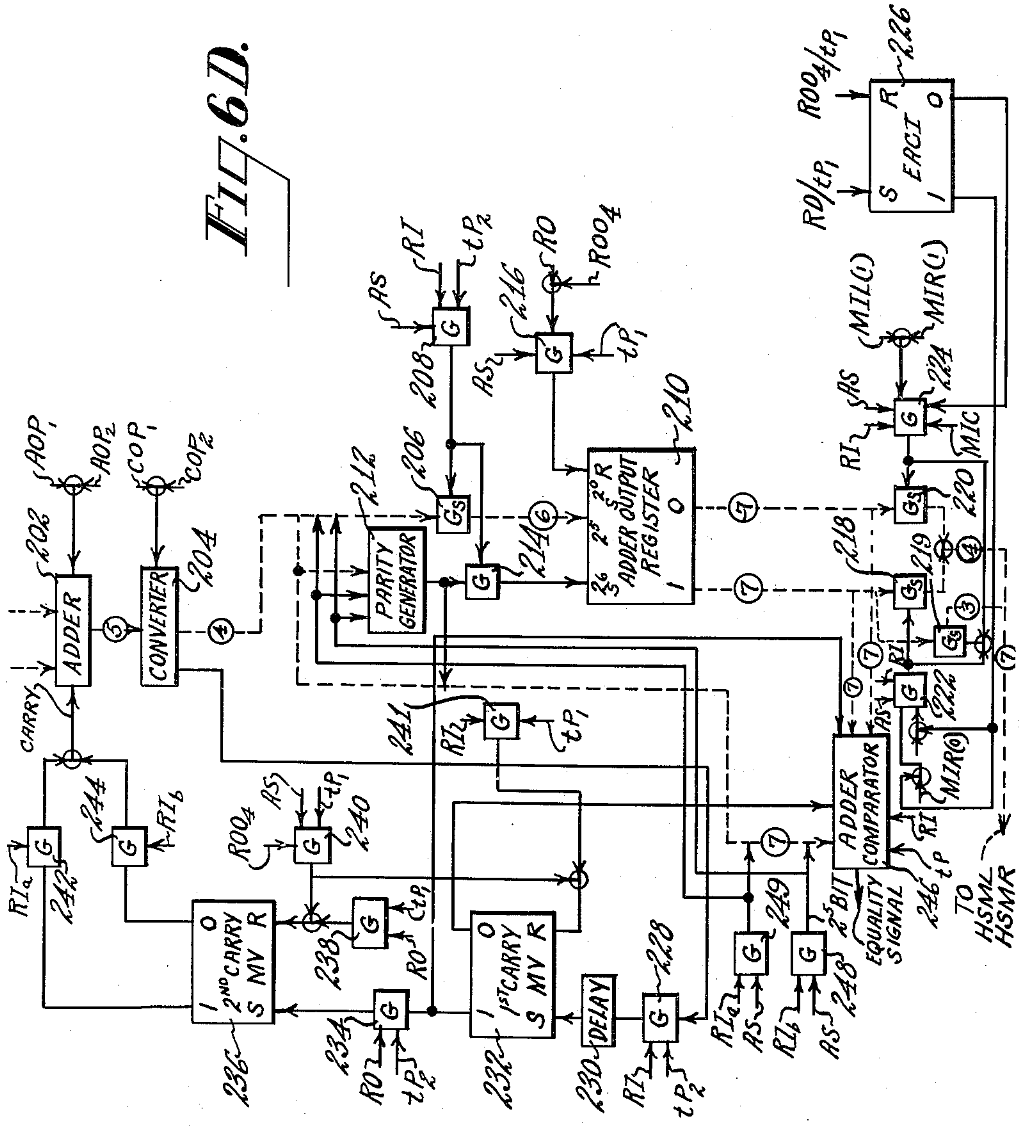

The novel features of the invention, as well as the invention itself, both as to its organization and method of operation, will best be understood from the following description, when read in connection with the accompanying drawings, in which like reference numerals refer to like parts, and in which:

FIG. 1 is a generalized block diagram of a system for practicing the invention, including operation control circuits and adder and subtracter circuits;

FIG. 2, comprising FIGS. 2A to 2L, is a legend identifying the notations employed in the detailed representation of the system;

FIG. 3, comprising FIGS. 3A to 3L, is a timing diagram for various signals employed in the operation of the system;

FIG. 4 is a block diagram of an arrangement which may be employed for the operation control circuits of FIG. 1;

FIG. 5 is a flow diagram illustrating the operation of the status level generator; and FIG. 6, comprising FIGS. 6A to 6D, inclusive, is a block diagram of the detailed arrangement of an adder and subtracter system. When placed together in proper order, FIG. 6A is at the top, with FIG. 6B immediately below; FIG. 6C is below FIG. 6B, and FIG. 6D is at the bottom, below FIG. 6C.

INDEX

The following is an index to the principal parts of the present specification, within which each of the parts is similarly identified:

I. Codings Employed
II. Arithmetic Operations
III. General System
IV. Components of the System
V. Status Levels and Timing Signals
VI. Detailed Arrangement
VII. Conditions of Operation
VIII. The Status Levels
IX. System Operation X. Other System Operations
XI. Conclusion

I. Codings Employed

To explain the invention we may assume the use of a code in which each character, such as a letter of the alphabet, a special symbol, or a decimal number from 0 to 9 may be represented by a six binary-digit combination. The four least significant digits form the numerical portion of the number. If an excess three code is employed with this scheme, the four least significant binary-digits of a number are three greater than the decimal equivalent of the number. For example:

Decimal 0=010011
Decimal 1=010100
Decimal 2=010101

The binary-coded decimal form represents a multi-digit decimal number by a series of coded binary equivalents. The least significant numerical characters of a grouping may be placed first, with the other numerical characters of successively higher order following in succession. The binary digits ("bits") of like order for the various characters are placed in the same row or digital position.

The least significant numerical character of a grouping may be preceded by a special character or symbol denoting the sign of the quantity. The sign characters employed are the minus (Mi) and blank (space or Sp) symbols. When used to indicate sign the Sp symbol represents a positive sign. The most significant numerical character of a grouping may be followed by a special character of symbol to denote the termination of the grouping (item separator or IS symbol) or a blank (space or Sp symbol). Such special symbols are here termed end of operand symbols. These special symbols may take any particular form which does not cause confusion with the characters already assigned coded designations. For example, to be specific, the space character may be coded as 000001, the item separator may be coded as 111100, and the minus sign may be coded as 001001. Placement of the sign characters on the right permits flexibility in the tabulation and representation of information.

II. Arithmetic Operations

The arithmetic operation of subtraction is here performed by the nines complement method. The nines complement of an individual number is the difference between the number and nine; thus, the nines complement of two is seven. Subtraction is performed by adding the nines complement of the subtrahend to the minuend, with a simple correction. For example, to subtract two from eight: the nines complement of two, which is seven, is added to eight, giving the sum of five and a carry in the binary-coded decimal system. The correction consists of discarding the carry digit and adding one, to secure the correct result of six. This correction is sometimes called "end-around-carry."

Subtraction by nines complement may also be performed in the binary-coded decimal excess three system. To subtract 0101 from 1011 (two from eight), the nines complement of 0101 must be added to 1011. Nines complementing is particularly easy with an excess three code, because the nines complement is obtained by complementing each binary digit of a combination. Thus, in the following examples:

Decimal 0=0011, complemented=1100=decimal 9
Decimal 2=0101, complemented=1010=decimal 7
Decimal 8=1011, complemented=0100=decimal 1

When 1010 (7, or the complement of two) is added to 1011 (decimal 8) the difference of 10101 is obtained. The sum is corrected, and the end-around-carry sequence is carried out by adding 0100 (decimal one), as the end-around-carry and dropping the highest order digit. The result is therefore the correct excess three code equivalent (1001) of decimal six.

To make the operation of subtraction in the binary-coded decimal system more clear, the following example is provided:

$$\begin{aligned} 426 &= 426 \\ -268 &= \underline{731} \text{ (nines complement)} \\ &\phantom{=} 1157 + \text{end-around-carry} \\ &= 158 \end{aligned}$$

A fuller description, and further examples, will be provided in the following description of the system and its operation.

III. General System

A generalized block diagram (refer to FIG. 1) is included in the specification to aid in the understanding of the arrangement. The generalized block diagram shows broadly the flow of information throughout the system. The great number of connections between the various units, and the considerable number of components within or associated with each unit, will be shown and described with reference to the detailed arrangement of FIG. 6.

With reference to FIG. 1, the arrangement employs two high-speed memory banks, designated HSML 50 (high-speed memory left) and HSMR 52 (high-speed memory right). The left memory HSML 50 receives address information from an A counter 10; the right memory HSMR 52 receives information from a B counter 12. Either of the two memories HSML 50 and HSMR 52 may receive address information from a C counter 14. A fourth, E counter 16 is coupled to both the A and C counters 10 and 14 and may control the operations of the A and C counters 10 and 14 under certain conditions.

The output of the left memory HSML 50 is directed through a memory register left (MRL) 80 to symbol recognition circuits 108 and to adder and converter circuits 200. The symbol recognition circuits 108 (see also FIG. 6C) may detect and utilize the occurrence of the special terminating and sign indicating signals. The output of the left register MRL 80 may also be returned to a data input of the left memory HSML 50.

The adder and converter circuits 200 include a binary adder and a binary to coded-decimal converter. The binary adder as herein employed adds two four binary digit inputs and a one binary digit carry input. For each digital position in the binary adder there may be employed a three-input adder of the type shown at pages 276–277 of the book "High-Speed Computing Devices," written by the Staff of Engineering Research Associates, Inc., and published (1950) by the McGraw-Hill Co., Inc.

The binary adder, which may be a three-input adder, provides a pure binary sum or difference to a binary to coded-decimal converter which changes the pure binary quantity to the binary-decimal code. A binary to coded-decimal converter is shown and described in a copending application for patent entitled "A Code Converter," Serial No. 312,528, now abandoned, filed October 1, 1952, by I. H. Sublette and A. M. Spielberg, and assigned to the assignee of the present invention.

The right memory HSMR 52 is coupled to circuits in a fashion similar to that of the left memory HSML 50. The output of the right memory HSMR 52 is directed through a memory register right (MRR) 82 to the adder converter circuits 200 and to symbol recognition circuits 158. The output of the right register MRR 82 may also be returned as input data to the right memory HSMR 52.

The outputs of the adder and converter circuits 200 are directed to an adder output register 210 which is coupled to the inputs of both memories HSML 50 and HSMR 52. A checking arrangement is provided, comprising a parity generator 212 and an adder comparator 246. The adder converter circuits 200 are coupled directly to the adder comparator 246 and are also coupled to the adder comparator 246 through the parity generator 212. An output of the parity generator 212 is also coupled to the adder output register 210, and an output of the adder output register 210 is also applied to the adder comparator 246. A parity generator, such as parity generator 212, may provide an added binary digit to each character signal combination for checking purposes. Thus a six binary digit character signal combination, with parity bit added, becomes a seven bit combination. A suitable parity generator is shown and described in Patent No. 2,674,727 entitled "Parity Generator," issued to Arnold Spielberg on April 6, 1954. The adder comparator 246 compares the output of the adder converter circuits 200, including an added signal from the parity generator 212, to the output of the adder output register 210. The adder comparator 246 signals if the two combinations are equal. An arrangement which may be employed as this comparator 246 is shown and described in a copending application for patent entitled "Electronic Comparator," filed August 24, 1953, Serial No. 375,869, now Patent No. 2,877,445, by Philip Cheilik and assigned to the assignee of the present invention.

The present arrangement may operate with a computing system which provides the requisite input data and utilizes the results obatined therefrom. The computing system may be of the type described in an application for patent concurrently filed by L. S. Bensky, entitled "Information Handling System," Serial No. 478,021. As is well known, computing systems may place quantities which are to be operated upon at definite locations in the memories and may select automatically or by program instruction a point in the memories at which the result of the operation is to be placed. Computing systems may also "remember" the address of the two operands and the address of the result, and staticize these addresses when they are needed. Further, the computing system may direct which operation is to be performed and which of the two operands is to be placed in each of the memories. In operation, therefore, information to be utilized in an addition or subtraction is placed in the two memories HSML 50 and HSMR 52. The address of one operand is placed in the A counter 10, the address of the other operand is placed in the B counter 12, and the address of the result is placed in the C counter 14. In a sequence of timed steps, individual characters from each of the operands are read out of the memories HSML 50 and HSMR 52 to the registers MRL 80 and MRR 82. Information held in the registers MRL 80 and MRR82 is utilized by the symbol recognition circuits to determine whether the information should be provided to the adder converter circuits 200. In accordance with the characters occurring in each of the operands the arrangement carries out different sequences of operations automatically to obtain final correct results. Characters which are added or subtracted in the adder converter circuits 200 are checked for correctness before being placed in the memory from the adder output register 210.

The timed sequences of operations include one in which an end-around-carry may be effected. In the end-around-carry operation the E counter 16 is employed in selecting the address of the least significant character in the result. Because the generalized diagram of FIG. 1 is intended only to identify some of the principle units of the arrangement and to provide a picture of the general information flow, no description of detailed operations is given at this point. The operations are described in detail in connection with the description of FIG. 6.

*IV. Components of the System*

A group of diagrams, in the nature of a legend (refer to FIG. 2), have been provided to illustrate the conventions employed in the drawing. These conventions have been employed for simplicity and clarity.

FIG. 2A shows a single conductor, used here in conventional fashion. FIG. 2B, however, shows the manner in which a number of parallel conductors are represented as a dotted line having an inset circle enclosing a number designating the quantity of parallel conductors (here six).

An "or" circuit (refer to FIG. 2C) is shown by converging arrows within a circle. "Or" circuits are well known. Such circuits have a plurality of inputs and provide an output signal when input signals are present on any one or more of the inputs. When a number of parallel channels or conductors are connected severally to a corresponding number of conductors through "or" circuits, the representation of FIG. 2D is used. FIG. 2D represents six parallel "or" circuits, each coupling a different channel of one group of conductors to a corresponding channel of another group of six conductors.

A single "and" gate is shown (refer to FIG. 2E) by a rectangle having an inner G. An "and" gate, or coincidence gate, may have two or more inputs and provides an output signal when, and only when, input signals are present on all of its inputs. A plurality of parallel "and" gates are represented (refer to FIG. 2F) by a rectangle having an inner "G*s*." The term parallel is here used to denote a group of like elements which are simultaneously operable.

A component employed within the present system for recognizing one of a number of signal combinations is a recognition gate. A recognition gate (FIG. 2G) may "recognize" the absence of a particular signal combination. Thus, in logical terms, a recognition gate may indicate by a high level output the absence of an ISS combinaiton, that is, the presence of "NOT ISS." To provide a signal indicative of the presence of an ISS combination, the output from the recognition gate may be inverted. The arrangement utilized may be as follows: if a 1100 output from a staticizer is to be detected, "or" together staticizer outputs in the pattern 0011, using the complemented output of each desired bit. The "or" circuit will provide a high level output except when the desired pattern (1100) is provided by the staticizer. When the output is inverted, a high level output is provided only on the presence of the 1100 combination.

Bistable multivibrators, or flip-flops, are well known in the art and may be employed for the representation of binary quantities. A bistable multivibrator (see FIG. 2H) has two sections, either one of the two sections having a high level steady state output at a given time. Each section has an input, and the output from the section is high when the corresponding input is impulsed. In one section, multivibrators may have a set (S) input and a "1" output terminal. In the other section, multivibrators may have a reset (R) input and a "0" output terminal. The multivibrator also may include a trigger (T) input, the application of signals to which reverses the outputs provided from the multivibrator.

A block with an inner I designates a signal inverting device (see FIG. 2I). The inverters employed may be any suitable type.

A register may be a group of multivibrators each of which staticizes a different binary digit in a character or other signal combination (refer to FIG. 2J). Although the multivibrators in a register are arranged in parallel, a single designation corresponding roughly to that of an individual multivibrator is employed here. That is, a register is shown symbolically as having only individual set and reset inputs and "1" and "0" outputs. The multichannel input and output lines, however, for each register are actually connected to the individual multivibrators for each digital position. The multivibrators in the register may be set or reset by individual signals applied simultaneously to the different inputs of the multivibrators. In this way a desired signal combination may be entered in the register. All multivibrators may be reset simultaneously by a reset signal from a single source.

Binary counters (see FIG. 2K) are also employed in the present system. Binary counter may comprise a chain of bistable multivibrators each of which includes a trigger input as well as reset and set inputs. A signal applied to the added, trigger (T) input reverses the state of the multivibrator. The multivibrators in the chain are formed into a counter by coupling a given output of each multivibrator to the trigger input of the next succeeding multivibrator. As with the designations employed in the register, all the set and reset inputs "1" and "0" outputs are shown together, but multi-channel input and output lines are indicated. A single channel is coupled to the trigger input, because pulses applied to the lowest order multivibrator increase the count provided by the counter by one. Again, however, the various multivibrators in the counter may be set or reset from a single channel or individually from different channels. The counter shown in FIG. 2K is a reversible counter having add and subtract inputs. After the application of the signal to the add input, the counter counts in ascending fashion. After the application of a signal to the subtract input the counter counts each trigger input in descending fashion. Note that a binary quantity, such as an address for a memory, may be set into the counter by activating a desired combination of set and reset inputs with signals which blank out carry signals between the multivibrators.

Two high-speed memories are employed in the present arrangement, but are not described in detail. Each memory (refer to FIG. 2L) includes a number of character storage positions, at each of which may be stored seven binary digits. Each high-speed memory includes means for receiving address signal combinations and retaining (staticizing) the address until a read or write signal is applied. When operating, all the binary digits of a single character signal combination are written in or read out together. Before starting an addition or subtraction operation, the operands are stored at definite locations in each of the memories by the computing system either automatically or under control of the programmer.

V. *Status Levels and Timing Signals*

In an addition or subtraction operation, the system normally employs a succession of different status levels. Each status level represents a condition in which a certain predetermined group of components of the system are activated for transmitting or utilizing information in a sequence. The status levels may occur in a varying order, as the sequencing is in part under control of the operands. Each status level, however, although it may occur repetitively or several times in succession, consumes a definite interval of time.

During each status level a succession of timing pulses occur. The relationship of the timing pulses and the other timing signals of interest in this application is shown in the timing diagram of FIG. 3, comprising FIGS. 3A to 3H.

The various status levels of interest in the present application are identified as follows: $ROO_1$, $ROO_2$, $ROO_3$, $ROO_4$, RS, RIC, RI, RO, RD, and IC. Each of these status levels is used for a particular function, or a number of functions, as will be described. Each status level, however, begins with $tp_1$ (FIG. 3A) and ends with $tp_8$ or $tp_{8s}$ (FIG. 3D). As shown in FIG. 3A, each timing pulse may be 1 µsec. in duration. The interval between the end of each timing pulse and the occurrence of the succeeding timing pulse is also 1 µsec, except that the interval between $tp_4$ and $tp_5$ is 3 µsec. The time intervals here given are merely illustrative of time relationships which may be employed in practicing the invention.

Such a sequence of timing pulses may be derived from a timing pulse generator operating continuously. The timing pulse generator, for example, may include a magnetic drum which provides a timing pulse from a timing track approximately once every 20 µsec. The timing pulse generator may also include a series of delay lines responsive to the timing pulses from the drum. Pulses in the above pattern, from $tp_1$ to $tp_8$, may be derived from taps taken in the series of delay lines.

During certain status levels and at certain times other timing signals are also desired. These timing signals may be derived from the basic sequence of timing pulses through the employment of gating, multivibrator, and delay arrangements. A signal designated $RI_a$ (see FIG. 3B) is desired as an adder input pulse during the RI status level starting with the beginning of $tp_1$ and terminating shortly after the end of $tp_3$. Another signal may be desired during the RI status level from the beginning of $tp_6$ to shortly after the termination of $tp_8$. The adder input pulses, which are to occur when "A" or "S" signals are present, may be derived by pulse stretching techniques or by the use of a bistable multivibrator. For example, using gates to determine the occurrence of the RI status level and that an "A" or "S" signal is present, $tp_1$ may be employed to set the multivibrator, and a delayed $tp_3$ may be employed to reset the multivibrator. The "1" output of the multivibrator then provides the desired $RI_a$ signal. In the same manner, an $RI_b$ signal may be provided in the start of $tp_6$ to shortly after the termination of $tp_8$.

A memory output clock pulse (MOC) and a memory input clock pulse (MIC) may be generated by like means during each of the status levels (see FIG. 3C). The memory output clock pulse MOC is provided from the start of $tp_2$ to shortly after the close of $tp_4$. The memory input clock pulse MIC is provided from the start of $tp_5$ to the start of $tp_8$.

During each of the status levels also, an additional $tp_{8s}$ signal may be provided (refer to FIG. 3D). As shown, $tp_{8s}$ may be a pulse of 1 µsec. duration beginning with the termination of $tp_8$. $tp_{8s}$ may be employed for initiating the subsequent status level. Other signals may be employed during specific status levels for a reset function at the start of the status level. Thus a timing pulse which is specially employed at a number of points is $tp_1$ in the RD status level. This pulse, designated $RD/tp_1$, is shown in FIG. 3E. The $tp_1$ occurring during the $ROO_4$ status level is similarly used and, deseignated $ROO_4/tp_1$, as shown in FIG. 3G.

Adder output pulses are provided during certain intervals in each RI status level. The adder output pulses (see FIG. 3H) are designated $AOP_1$ and $AOP_2$. $AOP_1$ starts mid-way between the beginning of $tp_1$ and $tp_2$ and ends on the start of $tp_3$. $AOP_2$ starts mid-way between the beginning of $tp_6$ and $tp_7$ and ends on the start of $tp_8$.

Two converter output pulses ($COP_1$ and $COP_2$) are also provided (refer to FIG. 3I). The converter output pulses occur during the RI status levels when an "A" or "S" signal is provided. Dividing the time interval between the commencement of successive time pulses into quarters, $COP_1$ may be said to occur from 1¾ to 2¾, and $COP_2$ may be said to occur from 6¾ to 7¾ in the time pulse sequence.

An arrangement which may be employed for generating status levels in the desired sequence is shown in FIG. 4. A flow diagram showing the various changes of status levels is shown in FIG. 5. The changes of status levels will be described in detail in connection with the operation of the system. Briefly, however (refer now to FIG. 4), the status level generator includes a number of bistable multivibrators, 302, 304, 306, etc., to 320 each of which is set by a different status gate 330, 332, 334, etc., to 366. The "1" output of each of the status level multivibrators 302 to 320 represents one different status level signal, from $ROO_1$ to IC. Accordingly, each of the multivibrators 302 to 320 is designated as an $ROO_1$, or other, multivibrator. When any one of these multivibrators 302 to 320 is set all the others are reset, so that only one status level signal may be provided at a given time. Not more than one of the number of gates 330 to 366 provides a signal at a time.

Each individual gate, e.g. 330, or group of gates, coupled to a status level multivibrator, e.g. 302, is also coupled, through a first delay line 322 to an "or" circuit 326. The output of the "or" circuit 326 resets each of the multivibrators 302 to 320. Signals provided from the various status gates 330 to 366 are also delayed in second delay lines 324 before being applied to the set input of the multivibrator 302 to 320 to which they are coupled. Therefore, when a change in status level is to occur, the signal which is provided from a status gate 330 to 366 is first delayed long enough (in the first delay line 322) to permit the activating pulse to expire. Then all multivibrators 302 to 320 are reset through the "or" circuit 326. The activating pulse, delayed in the second delay line 324 long enough to permit complete resetting, then sets only the desired status level multivibrator 302 to 320. For example, when an operation is to be commenced the computing system provides a start operation signal to the status gate 330 coupled to the $ROO_1$ multivibrator 302. A "1" output is provided only from the $ROO_1$ multivibrator 302, and this "1" output is the $ROO_1$ status level signal. To shift to the next status level, $ROO_2$, the $ROO_1$ status level signal primes one input of an "and" gate 332 coupled to the set input of the $ROO_2$ multivibrator 304. On the occurrence of the next $tp_8$, therefore, this last mentioned $ROO_2$ "and" gate 332 is fully activated and provides an output which, in the manner previously described, sets only the $ROO_2$ multivibrator 304. The above explanation is only a brief exposition in the manner in which status levels are changed. More complex relationships may determine other changes of status level, as will be brought out more fully below.

*VI. Detailed Arrangement*

The detailed arrangement of the system is shown in FIG. 6. For clarity and simplicity shorthand designations have been used to indicate input signals which are actually derived by connections between units. "Or" circuits are shown in the drawing, but not numbered. The conventions observed in the legend of FIG. 2 are used throughout FIG. 6. The various components will be referred to by abbreviations after descriptive names corresponding to the abbreviations have been set out.

Referring now to FIG. 6A, the system employs an A counter 10, a B counter 12, and a C counter 14. The A and C counters 10 and 14, respectively, are reversible and accordingly have add and subtract inputs. The A counter 10 and the B counter 12 have eleven channel address inputs and the C counter 14 has a twelve channel address input. A reversible E counter 16 is also employed. The add and subtract inputs of the A counter 10, the C counter 14, and the E counter 16 are controlled by signals from a reversing multivibrator (RMV) 19.

Trigger input signals for each of the counters 10, 12, 14, and 16 are derived from separate gating arrangements. Signals are provided to the trigger input of the A counter 10 from G18. Signals are provided to the trigger input of the C counter 14 from G20 and the trigger input of the B counter 12 receives signals from G22. Trigger input signals are also applied to the A counter 10 and the C counter 14 from G24. The E counter 16 receives trigger input signals from G26 through a delay line 28 and from G30. A counter 10 and C counter 14 trigger inputs applied from G24 are controlled by the value of the $2^5$ bit from the E counter 16.

The outputs of the A counter 10, the B counter 12, and the C counter 14 are directed to the high-speed memory left (HSML) 50 and the high-speed memory right (HSMR) 52 (FIG. 6B). The output seignals are applied through gates which may be said to control the passage of signals between the two components. The output of the A counter 10 (referring again to FIG. 6A) is directed to HSML 50 through Gs32 while the output of the B counter 12 is directed to HSMR 52 through Gs34. Gs32 and Gs34 are controlled by a separate gate G36. Outputs from the C counter 14 may be directed to HSML 50 through Gs38 and to HSMR 52 through Gs40. Gs38 and Gs40 are controlled by another gate G42.

The two high-speed memories HSML 50 and HSMR 52 (FIG. 6B) receive information from the counters of FIG. 6A. Read-write signals are applied to HSML 50 from an HSML read-write multivibrator 54. The HSML read-write multivibrator 54 may be set by signals from G36 or G42 and reset by any one of three gates, G56, G58, and G60. HSMR 52 read-write signals are applied from a HSMR read-write multivibrator which is set by signals from G36 or G42 and which may be reset by any one of three gates G64, G66, and G68.

Data may be supplied to HSML 50 and HSMR 52 through a Space write gate (SWG) 70 and a Minus write gate (MWG) 72. When fully activated, SWG 70 and MWG 72 generate the proper signal combinations for Space and Minus symbols, respectively.

The output of HSML 50 is directed through Gs74 to the set inputs of a memory register left (MRL) 80. The output of HSMR 52 is directed through Gs76 to the set inputs of a memory register right (MRR) 82. Gs74 and Gs76 are controlled by a sepaarte gate G78.

The reset inputs of MRL 80 are controlled by G84 and G86. The reset inputs of MRR 82 are controlled by G88 and G90. One given combination of signals, representing the quantity three, may be applied to the set and reset inputs of MRL 80 to write the quantity three into MRL 80. This given combination is derived from G92 through delay line 94. A similar combination of signals may be applied to certain of the set and reset inputs of MRR 82 through G96 and delay line 98.

Outputs from MRL 80 are returned to HSML 50 through Gs100. Gs100 is controlled by G102. Outputs of MRR 82 are returned to HSMR 52 through Gs104. Gs104 is controlled by G106.

In FIG. 6C are circuits 108 for recognizing and utilizing special symbols occurring in the output of MRL 80 and other circuits for controlling the flow of signals from MRL 80 (FIG. 6B) to the adder 202 (FIG. 6D). Three recognition gates 110, 112, and 114 (FIG. 6C) are employed, each responsive to a particular combination of "1" and "0" signals from MRL 80 (FIG. 6B). The recognition gates are termed the Not SP recognition gate 110 (FIG. 6C), the Not ISS recognition gate 112, and the Not Minus recognition gate 114. Inverters (I) 116, 118, and 120 are coupled to the outputs of the recognition gates 110, 112, and 114, respectively. The significance of the output of a recognition gate is reversed by the coupled inverter, which inverts the signal provided. Thus the output of the several inverters 116, 118, 120 may be said to be Space, ISS, or Minus symbol detected signals.

An item separator or space left (ISPL) multivibrator 122 and a minus left (MIL) multivibrator 124 are also employed in the symbol recognition circuits of FIG. 3C. ISS detected signals from I118 are directed through G126 to the set input of ISPL 122. Space detected signals from I116 and minus signals from I120 set ISPL 122 through G128. Minus detected signals from I120 also set MIL 124 through G130. Further set signals for MIL 124 are derived from G132. Trigger input signals for MIL 124 are derived from G134. G136 provides reset signals for MIL 124 through delay line 138. Reset signals are provided for ISPL 122 and MIL 124 from $RD/tp_1$. Reset signals for ISPL 122 alone are provided from G140.

The circuits which control the flow of signals from MRL 80 (FIG. 6B) to adder 202 (FIG. 6D) include Gs142, coupled to the "1" output of MRL 80, and Gs148, coupled to the "0" output of MRL 80. Although six bit outputs are provided from MRL 80 and MRR 82, only four of the bits (the four numerical bits $2^0$ to $2^3$) are directed to the adder 202. The outputs of G*s*142 and G*s*148 are combined together before being directed to the adder 202. G*s*142 is controlled by G144 and G146. G*s*148 is controlled by G150 and G152.

Symbol recognition gates are also employed in the right-hand side of the arrangement (see FIG. 6C). As on the left-hand side of the arrangement, three recognition gates are employed, these being a Not Minus recognition gate 160, a Not ISS recognition gate 162, and a Not Space recognition gate 164. The three recognition gates 160, 162, and 164 are responsive to particular combinations of signals from MRR 82 (FIG. 6B) and each provides an output to a coupled inverter 166, 168, or 170, respectively.

A minus right (MIR) multivibrator 172 (FIG. 6C) and an item separator or space right (ISPR) multivibrator 174 are employed in these symbol recognition circuits. Minus detected signals from I166 are applied to the set input of MIR 172 through G176. Set input signals are also applied to MIR 172 through G178. Set input signals are applied to ISPR 174 from I166 and I170 through G180.

ISS detected signals from I168 are applied to the set input of ISPR 174 through G182. MIR 172 is reset and ISPR 174 is set, by signals from G184. The trigger input of MIR 172 is activated by signals from G186.

"1" outputs of MRR 82 (FIG. 6B) and "0" outputs of MRR 82 are passed through G*s*188 and G*s*194 (FIG. 6C) before being combined and applied to one group of inputs of the adder 202 (FIG. 6D). G*s*188 is controlled by G190 and G192. G*s*194 is controlled by G196 and G198.

Certain connections are made between the components of the left and right sides shown in FIG. 6C. Set ISPR signals are derived from G132. Set ISPL signals are derived from G178. G140 outputs are applied to the reset input of ISPR 174. G184 is coupled to the set input of ISPL 122 and to the reset input of MIL 124. The output of G136 and the coupled delay line 138 is applied to the reset input of MIR 172.

The adder circuits are shown in FIG. 6D. The adder 202 has two groups of four bit inputs, each of which is responsive to a different set of signal combinations from the gating arrangements of FIG. 6C. The adder 202 also has a carry input. Outputs from the adder 202 are applied to the binary to coded decimal converter 204. The converter 204 provides a multi-channel output and a carry output. The multi-channel output from the converter 204 is directed to a parity generator 212 and through G*s*206 to an adder output register (AOR) 210. G*s*206 is controlled by G*s*208.

Adder output register (AOR) 210 staticizes the character corresponding to the output of the converter 204. The converter 204 output represents the four least significant bits of the character, so that signals for these bits are applied to the $2^0$, $2^1$, $2^2$, and $2^3$ sets inputs of AOR 210. The $2^4$ and $2^5$ bit inputs of AOR 210 are provided through G249 and G248, respectively. The $2^6$ set input of AOR 210 is activated by signals provided from parity generator 212 through G214. G214 is controlled by G208. AOR 210 is reset by the output of G216.

The "1" and "0" outputs of AOR 210 are divided and combined in a predetermined fashion. The four lowest order bits ($2^0$ to $2^3$) from the "1" outputs are directed through G*s*218. The four lowest order bits ($2^0$ to $2^3$) from the "0" outputs are directed through G*s*220. The three highest order bits ($2^4$ to $2^6$) from the "1" outputs of AOR 210 are directed through G*s*219. The outputs of G*s*218 and G*s*220 are combined into a four channel group. The outputs of G*s*219 are coupled into this four channel group to provide a final seven channel group. The seven channels, carrying the $2^0$ to $2^6$ bits, are coupled to the inputs of HSML 50 and HSMR 52 (FIG. 6B). G*s*218 (FIG. 6D) is controlled by G222 and G*s*220 is controlled by G224. Either G222 or G224 opens G*s*219. Both G222 and G224 are controlled by the outputs of an end-around-carry indicator (EACI) multivibrator 226.

Carry outputs from the converter 204 are directed successively through G22 and delay line 230 to the set input of a first carry multivibrator 232. "1" outputs from the first carry multivibrator 232 are applied through G234 to the set input of a second carry multivibrator 236. The second carry multivibrator 236 may be reset by the output of G238 or the output of G240. The first carry multivibrator may be reset by the output of G240 or by the output of G241.

"1" outputs of the second carry multivibrator 236 and "0" outputs of the second carry multivibrator 236 are combined and applied to the carry input of the adder 202. The "1" outputs of the second carry multivibrator 236 are controlled by G242 and "0" outputs of the second carry multivibrator are controlled by G244.

The multi-channel output of the converter 204, which comprises four channels, is combined together with the output of the parity generator 212, and the outputs of G248 and G249 are applied to an adder comparator 246. As is explained below, these combined signals may represent a seven channel input to one side of the adder comparator 246. An eighth input is applied to the adder comparator 246 from the "0" output of the first carry multivibrator 232. The eighth input is on the same side of the adder comparator 246 as the previously described seven inputs. Another group of inputs are applied to the adder comparator 246 from the "1" and "0" outputs of AOR 210. An eighth channel signal, derived from the "1" output of the first carry multivibrator 232, is combined with the signals provided from AOR 210. The adder comparator 246 may provide an equality signal, when no discrepancy occurs. Failure to provide the alarm signal indicates a discrepancy, or that the adder comparator 246 is inoperative.

*VII. Conditions of Operation*

A general function of the system is to add or subtract two operands and put the answer in one of the memories. The operands, for example, may be binary-coded decimal operands as follows:

Sp423SpSpSp

SpSp14MiSp

Although the operands are treated in decimal fashion the operation may be more precisely called algebraic, because the signs of the operands and the special symbols are utilized in the operation.

In the operation of the system information is assumed to be grouped into items of variable, non-standard maximum length. Each item is separated from other items by at least one of the special characters or symbols, such as space or item separator symbols. A space symbol is treated as the equivalent of a plus symbol for purposes of indicating the sign of an operand. A minus quantity is indicated by the special minus symbol. The sign of an operand is determined and signified by the special symbol, either space or minus, placed adjacent to the least significant character of a quantity. When the quantities are handled least significant characters first, the sign symbol immediately precedes the least significant character and may be said to be at the right of the operand. The memory contains blank (space or Sp) symbols wherever some other character has not been stored.

Quantities are assumed to be in excess three code. Each character is further assumed to be composed of seven binary digits including one parity bit. Addresses of characters in the memory are provided as eleven binary digit combinations. The present arrangement may be a part of the computing system described in the concurrently filed Bensky application, which provides operand and address information. The address information specifies the location of the operands in the memories and indicates where the result of an operation is to be placed.

The addresses of the two operands are applied to the A counter 10 and the B counter 12 of FIG. 6. The address of the result is an eleven binary digit signal combination set into the C counter 14 at the beginning of the operation. In addition, a twelfth binary digit value ($2^{11}$ digit) is applied to the C counter 14 to indicate and control whether the result is placed in the left memory or the right memory. By automatic or manual program means add and subtract signals (A and S, respectively) may be provided. The arrangement will add or subtract depending upon whether an A or an S signal is present. An additional control signal, called option bit *c*, may be supplied to indicate whether the subtrahend is in the left memory or in the right memory. Option bit *c* may have a binary "0" value (indicated as *c* (0)), indicating that the subtrahend is on the left, or a binary "1" value (indicated as *c* (1)), indicating that the subtrahend is on the right.

*VIII. The Status Levels*

Each of the status levels provides a particular series of individual events, which are sometimes referred to herein as status level sequences. As a general introduction to the operation of the system some of the principal functions of each status level are set out below. A status level sequence may be repeated several times in succession or intermittently during the course of an entire operation (refer now to FIG. 5). Conditions occurring within a status level sequence may determine which one of several alternatives is to be employed. Within each status level there is a sequence of timing pulses and there may be other timing signals for effecting the desired operation in an orderly manner.

*$ROO_1$ to $ROO_4$ status levels.*—These status levels initiate an operation and are used as a preparatory phase for setting up the conditions of operation, addressing the counters, and resetting the components of the system where necessary.

*RS status level.*—On the first RS status level the lowest order (least significant) characters are read from the memories. Special symbols are recognized if they occur. All characters are returned to the memories. Cycles of the RS status level sequences are repeated with the next characters, successively, until the least significant characters having numerical value are found. The last RS cycle occurs when the sign of each operand has been recorded and the least significant numerical characters are in position for a subsequent addition or subtraction operation.

*RIC status level.*—In the initial RIC status level a provisional sign may be assumed and written in to the memory as a part of a result. Provision may be made for subsequent complementation of either or both of the operands. The provisional sign may be altered during a later RIC status level if called for by the arithmetic result.

*RIC status level.*—The least significant characters having numerical value are added or subtracted during the first RI status level. The sum or difference provided is converted to a result in coded-decimal form. Carries resulting from the conversion from binary to coded decimal form are stored. In later RI status levels a stored carry may be added in with the characters of both operands. The character to be provided as a result is placed at the proper address at the result in the chosen memory. An RI status level may mark the termination of an operation if both operands have ended.

*RO status level.*—On each RO status level characters are read from the memories and a search is made for special symbols. If special symbols are encountered they may be returned to the memory. Subsequent to an RO status level there may be another RI status level if more addition is required. There may be an end-around-carry (RD status level), or the operation may terminate if the ends of both operands have been found and no carry is present.

*RD status level.*—In the RD status level the address of the least significant character in the result is found and preparation is made for an end-around-carry sequence. Thereafter the end-around-carry may be effected utilizing the carry digit and the stored result as the operands.

*IC status level.*—When an instruction is complete the system goes to the IC status level. As pointed out in broad terms above the instruction complete condition may result following any one of a number of status level sequence.

*IX. System Operation*

An example of an operation in which most of the features and status levels of the system are utilized is found in the following instructions:

Add: Sp423SpSpSp
to
SpSp14MiSp
Place the result (409 Sp) in HSML.

For the addition an A signal is provided. The value of option bit *c* has no effect in addition. A binary "1" stored as the $2^{11}$ bit in the C counter 14 (FIG. 6A) signifies that the result is to be stored in the left memory HSML 50 (FIG. 6B).

The first phase of an operation on the above problem is the selection of operands and the preparation of the system for handling the problem. This first phase is carried out during the ROO status levels.

At $ROO_1/tp_1$ A counter 10 (FIG. 6A), B counter 12, C counter 14, E counter 16, and RMV 19 are reset. The A, B, and C counters 10, 12, and 14 respectively, are therefore placed in condition to receive address input information. This address input information, and the "0" value for the $2^{11}$ bit in the C counter 14 may be provided during $ROO_1$ or one of the later ROO status levels. The E counter 16 starts the operation with a count of all zeroes.

On the conclusion of $ROO_1$ the $tp_8$ signal is provided. As shown in FIG. 4, the coincidence of $ROO_1$ and $tp_8$ provides an output from $ROO_2$ gate 332 which is applied to the $ROO_2$ multivibrator 304. In the manner previously explained an $ROO_2$ status level signal is provided from the $ROO_2$ multivibrator 304. All other status level multivibrators 302, 306 to 320, are in a reset condition. In similar fashion, subsequent $ROO_3$ and then $ROO_4$ status level signals are provided in a regular progression as $tp_8$ is reached in each status level.

On the occurrence of $ROO_4/tp_1$ G*i*84 (FIG. 6C) is fully activated and sets ISPL 122, resets MIL 124, resets MIR 172, and sets ISPR 174. The setting of ISPL 122 and ISPR 174 in effect assumes that a space is to be returned to each of the memories. At $ROO_4/tp_1$ also G216 (FIG. 6D) resets AOR 210 in preparation for later operations. At the same time and by the same pulse EACI multivibrator 226 is reset.

On the occurence of $tp_{8s}$ in the $ROO_4$ status level an output is provided from the status gate 338 coupled to the RS multivibrator 310 in the status level generator (FIG. 4). The arrangement enters the RS status level and begins the second phase of the operation.

The second phase of the operation consists of a search for the least significant characters having numerical value (as distinguished from special symbols) from each item. At the start of the RS status level, at $tp_1$, G36 (FIG. 6A) is fully activated. Also, G36 opens G*s*32 and G*s*34. Thus A counter 10 and B counter 12 provide addresses to HSML 50 and HSMR 52 (FIG. 6B) respectively. The memories 50 and 52 receive and hold the address information as long as read-write signals are suppled from their respective read-write multivibrators 54 and 62. Note that signals from G36 and G42, which set addresses into the memories 50 and 52, also set both HSML read-write multivibrator 54 and HSMR read-write multivibrator 62. The "1" outputs of these multivibrators 54 and 62, which are the read-write signals for the memories, are thus applied to the memories 50 and 52 unless a later, reset, signal is applied to one of the read-write multivibrators 54 and 62.

On $tp_1$, therefore, HSML 50 and HSMR 52 staticize the first characters in their respective operands. The first characters are space symbols.

At $tp_1$ also G86 and G90 (FIG. 6B) are fully activated. ISPL(1) and ISPR(1), which show the presence of space symbols, are provided at this time because ISPL 122 and ISPR 174 were set during the previous $ROO_4$ status level. MRL 80 and MRR 82 (FIG. 6B) are therefore reset, and in condition to receive new characters.

At $tp_2$ memory output clock pulse (MOC) begins. At MOC, G78 (FIG. 6B) is fully activated, and provides an output which opens Gs74 and Gs76. The space symbols staticized by HSML 50 and HSMR 52 are therefore applied to MRL 80 and MRR 82. MRL 80 and MRR 82 staticize the space symbols for later use in the operation.

The $tp_2$ pulse fully activates G18 (FIG. 6A), which has its other inputs primed by RS, AS, and ISPL(1) signals. The output of G18 is applied to the trigger input of A counter 10. Similarly, G22 is fully activated (by ISPR(1), $tp_2$, AS, and RS signals) and applies a trigger input to B counter 12. The counts staticized by the A counter 10 and the B counter 12 are thus advanced by one, so that each counter 10 and 12 represents the address of the next, second character in each item.

During MOC, therefore, a first character from each of the items is staticized by HSML 50 and HSMR 52 and set into MRL 80 and MRR 82. The symbol recognition circuits test the contents of the registers to determine whether special symbols are present. In the given example, the Not Space recognition gate 164 provides low level outputs in response to the space symbols staticized by the registers. The inverter 116 coupled to the Not Space recognition gate 110 on the left side therefore provides a high level output, which is the space symbol detected signal. Similarly, the inverter 170 coupled to the Not Space recognition gate 164 on the right side provides a high level space symbol detected signal.

At $tp_5$ in the RS status level G140 is fully activated and provides an output which resets ISPL 122 and also resets ISPR 174. At $tp_6$ in the RS status level, however, G128 is fully activated and ISPL 122 is set. At the same time and in the same manner G180 provides an output which sets ISPR 174. Thus ISPL(1) and ISPR(1) are provided, indicating the detection of space symbols in both operands.

At $tp_6$ G102 and G106 (FIG. 6B) provide outputs to Gs100 and Gs104, respectively. Thus the space character staticized by MRL 80 is entered into HSML 50 and the space character staticized by MRR 82 is entered into HSMR 52. The space characters are therefore returned to the same addresses from which they were taken in the memories 50, 52.

In this situation, $tp_{8s}$ does not activate any gate in the status level control circuits (FIG. 4). Thus the system remains in the RS status level for another sequence of timing pulses. A second RS sequence is now carried out for the same purpose of looking for the least significant numerical characters in the items. The characters which are now addressed in the memories are the second characters, which are a space symbol in the left memory and a minus symbol in the right memory.

The A counter 10 (FIG. 6A) addresses HSML 50 (FIG. 6B) and the B counter 12 (FIG. 6A) addresses HSMR 52 (FIG. 6B). MRL 80 and MRR 82 are reset to receive new information, and A counter 10 and B counter 12 (FIG. 6A) are advanced one. A space symbol is then read from HSML 50 (FIG. 6B) into MRL 80 and a minus symbol is read from the selected storage position of HSMR 52 into MRR 82.

As the two characters are held in the registers, ISPL 122 (FIG. 6C) and ISPR 174 are reset at $tp_5$. The characters staticized by the registers are at this time being applied to the recognition gates of FIG. 6C. The space symbol is detected at the Not Space recognition gate 110 on the left side and a space symbol detected signal is provided from the coupled inverter 116. The minus symbol staticized by MRR 82 (FIG. 6B) is detected by the Not Minus recognition gate 160 (FIG. 6C) and a minus symbol detected signal is provided by the inverter 166. At $tp_6$ in the RS status level G128 again provides an output, setting ISPL 122. $tp_6$ also fully activates G176 and G180 on the right-hand side, setting MIR 172 and ISPR 174, respectively.

The space character held in MRL 80 (FIG. 6B) and the minus character held in MRR 82 are returned to HSML 50 and HSMR 52 at $tp_6$. At $tp_6$ G102 opens Gs100 and G106 opens Gs104, passing the signal combinations back to the memories from the registers in the fashion described above.

A third RS status level sequence is now undertaken, because at $tp_{8s}$ ISPL(1) and ISPR(1) signals are provided and no gates 330 to 366 in the status level control circuits (FIG. 4) are fully activated. The third RS status level is a part of the continuing second phase of the operation. As the third RS status level is begun the A counter 10 (FIG. 6A) provides the address of the third character (space) in the left memory HSML 50 (FIG. 6B) and the B counter 12 (FIG. 6A) provides the address of the third character (4) in the right memory HSMR 52 (FIG. 6B).

The RS status level sequence begins in the manner described above. The memories 50 and 52 (FIG. 6B) are addressed, the registers 80 and 82 are reset and the A and B counters 10 and 12 (FIG. 6A) are advanced by one. On MOC, the space stored in HSML 50 (FIG. 6B) is written into MRL 80 and the character 4 stored in HSMR 52 is written into MRR 82.

At $tp_5$ ISPL 122 (FIG. 6C) and ISPR 174 are reset by G140. MIR 172, which was previously set to indicate the presence of a minus symbol, remains in the set condition.

Following the action of writing in the third characters in each item into the registers 80 and 82 (FIG. 6B), the registers 80 and 82 staticize the characters for the recognition circuits. The Space symbol staticized by MRL 80 is detected by Not Space recognition gate 110 (FIG. 6C) and a space symbol detected signal is provided by inverter 116. At $tp_6$ ISPL 122 is set. On the right side, however, the character (4) staticized by MRR 82 obviates special symbol recognition. MIR 172 and ISPR 174 therefore remain in the condition of MIR 172 set and ISPR 174 reset.

At $tp_6$ also the space in MRL 80 (FIG. 6B) is returned through Gs100 to HSML 50 and the character 4 in MRR 82 is returned through Gs104 to HSMR 52. As above, the characters are returned to the same positions at which they were stored when read out from the memories.

An ISPL(1) signal is provided during the occurrence of $tp_{8s}$. The presence of the ISPL(1) signal produces another situation in which none of the status gates of FIG. 4 are activated. Therefore the system repeats the RS status level for the fourth time.

To summarize the second phase of the operation to this point, the first three successive characters of each operand, starting with the least significant character, have been inspected and returned to their storage positions in the memories. The occurrence of a minus sign on the right side has been stored in MIR 172 (FIG. 6C) and a character 4 (the least significant numerical character of the operand in the right hand side) has been stored in MRR 82 (FIG. 6B). No addition has been made and the least significant numerical character (3) in the operand on the left side has not yet been found. The RS status level is repeated to pair together the least significant numerical characters of the two operands.

The fourth RS status level begins as did the previous RS status levels by addressing the memories HSML 50 and HSMR 52 (FIG. 6B) from their respective counters, A counter 10 and B counter 12 (FIG. 6A). G36 opens both Gs32 and Gs34 to provide this addressing function. MRL 80 (FIG. 6B) is reset at $tp_1$ because G86 is fully activated (by ISPL(1), RS, AS, and $tp_1$). MRR 82, however, is not reset because at this time G90 lacks an ISPR(1) input signal.

Only HSML 50 provides a character signal combination in this RS status level. A read-write signal is provided to HSML 50 from HSML read-write multivibrator 54 following $tp_1$ and the HSML read-write multivibrator 54 is not reset during the fourth RS cycle. The read-write signal applied to HSMR 52 is cut off at $tp_2$, however, because G66 is fully activated (by $tp_2$, AS, RS, and ISPR(0)) and resets HSMR read-write multivibrator 62. On MOC, therefore, G78 opens both Gs74 and Gs76, but signals are passed only from HSML 50 through Gs74 to MRL 80. The addressed character (3) in HSML 50 is therefore written into MRL 80.

$tp_2$ is applied to a fully primed G18 (FIG. 6A), and G18 provides an output which advances A counter 10 by one count. G22, however, is not fully primed (an ISPR(1) is lacking) so that B counter 12 is not advanced one and holds the same address.

At this point in time MRL 80 (FIG. 6B) staticizes the character 3 and MRR 82 staticizes the character 4. The recognition gates therefore do not detect any special symbol, G140 (FIG. 6C) resets ISPL 122 and ISPR 174 (FIG. 6D) at $tp_5$. But because no special symbol is present neither ISPL 122 or ISPR 174 is set at $tp_6$.

The character 3 stored in MRL 80 (FIG. 6B) is returned at $tp_6$ to HSML 50 in the manner described above. The character 4 which is stored in MRR 82 was returned earlier to HSMR 52.

At this stage of the operation, therefore, the least significant numerical character in each of the items has been found. The counters present the next addresses to be employed at the memories. The presence of a minus symbol in the operand on the right side is indicated by "1" output from MIR 172. Completion of the task of searching through Space symbols is indicated by "0" outputs from both ISPL 122 (FIG. 6C) and ISPR 174.

The second phase of the operation is terminated by entering the RIC status level. At $tp_{8s}$ in the fourth RS status level the first RIC status level gate 340 (FIG. 4) is fully activated. AS, RS, ISPL(0), ISPR(0), not ISSR, and not ISSL signals are provided to the first RIC gate 340 at this time, thus fully activating the first RIC gate 340. The not ISSR and not ISSL signals are provided until item separator symbols are detected in the items stored in the right or the left memory, respectively. A not ISSR signal may provided, for example, by one of the outputs of a bistable multivibrator responsive to the not ISS recognition gate 112 (FIG. 6C) and the coupled inverter 118, or directly from the inverter 118. The output of the first RIC gate 340 (FIG. 4) is applied to the RIC multivibrator 312 and an RIC status level signal results in the manner described above.

The beginning of the RIC status level initiates a third phase of the operation. In the third phase, there may be a provisional write-in to the memory of a sign for the result.

At $tp_1$ in the RIC status level the C counter 14 (FIG. 6A) is used to address the memories. G42 is fully activated and opens Gs38 and Gs40. The address staticized by C counter 14 is the address of the least significant character in the result. Here the least significant character in the result is to be the sign, either plus (space) or minus. The C counter 14 address is provided to and held by HSML 50 and HSMR 52 (FIG. 6B). The address is, however, held and used only in HSML 50, because the memory read-write signal is removed from HSMR 52 at $tp_2$. At $tp_2$ the inputs of G68 are all activated (by $tp_2$, RIC, and C CTR $2^{11}(0)$ signals) and G68 provides an output which resets the HSMR read-write multivibrator 62. Thus only HSML 50, which has been selected to hold the result, is addressed to the location at which a least significant character of the result is to be placed.

The C counter 14 (FIG. 6A) is advanced one count at $tp_2$ by fully activated G20 and staticizes the next address location for the result. E counter 16, which counts the number of characters in the result, is now employed. As is described below E counter 16 ends each complete addition or subtraction operation filled with binary zeroes, so that each operation is begun with the same combination staticized by E counter 16. At this point in time E counter 16 is in an add phase because of the "0" output provided by RMV 19. The count on E counter 16 is advanced at $tp_2$ by an output from G30. E counter 16 thus begins an additive count (the first signal providing a combination of 000001, the next providing 000010, etc.).

HSML 50 (FIG. 6B) is addressed at the first character of the result, and a minus in the right side operand is indicated by a MIR(1) output. The MIC signal, which begins with $tp_5$, therefore finds the minus write gate MWG 72 fully primed, so that MWG 72 provides an output. MWG 72 forms the minus signal combination, which is written into HSML 50. The minus symbol thus written into HSML 50 is in this situation a provisional sign for the result and is placed in the position preceding the least significant numerical character of the result. This provisional minus sign for the result may be changed if the results of the addition show that in fact the result is a positive quantity. In the example given the result will be positive and the minus sign will be changed; for the present, however, a minus result is assumed.

The existence of a minus quantity is held in and indicated by MIR 172. G136 is coupled to the reset input of MIR 172, but is not activated because an MIL(0) signal is provided.

The RIC status level is terminated and the RI status level is commenced at $tp_{8s}$. At $tp_{8s}$ the first RI status gate 356 (FIG. 4) is fully activated (by RIC, AS, EACI(0), and $tp_{8s}$ signals) and provides an output which sets the RI multivibrator 314 and provides an RI status level signal in the manner described above.

The fourth phase of the operation is begun with the RI status level. The fourth phase includes addition of successive pairs of characters, verification of each sum character, and placement of the sum characters in the memory. To recapitulate the previous processes, at the start of the RI status level the least signfiicant numerical characters of the two operands are held in MRL 80 and MRR 82 (FIG. 6B). These characters have also been returned to the locations in the memories from which they were read. A minus symbol has been written in as the first character of the sum in the chosen memory, HSML 50.

At $tp_1$ in the RI status level G42 (FIG. 6A) is fully activated and opens Gs38 and Gs40. The address staticized by C counter 14, which is the address of the first character following the minus sign in the result, is placed during $tp_1$ in HSML 50 and HSMR 52 (FIG. 6B). The address thus provided is held only by HSML 50 because at $tp_2$ the read-write signal is removed from HSMR 52. The HSMR read-write multivibrator 62 is reset at $tp_2$ by fully activated G68.

During $tp_1$ also the first carry multivibrator 232 (FIG. 6D) receives a reset signal. $tp_1$ fully activates G241, which applies a reset signal to the first carry multivibrator 232. Because the first carry multivibrator 232 was previously reset during $ROO_4$ the reset signal has no effect during this RI cycle.

As shown in FIG. 3, $tp_1$ marks the beginning of the $RI_a$ signal supplied during each RI status level. The $RI_a$ signal is provided until after $tp_3$ and is applied to G144, G150, G190, and G196 (FIG. 6C). The last mentioned gates are in the circuits which couple MRL 80 and MRR 82 (FIG. 6B) to the adder 202 (FIG. 6D). Only G144 (FIG. 6C) and G196 are fully activated, however, because at this point in time MIL(0) and MIR(1) signals are provided. G144 opens Gs142 which is coupled to the "1" outputs of MRL 80 (FIG. 6B). G196 (FIG. 6C) opens Gs194, which is coupled to the "0" outputs of MRR 82 (FIG. 6B). Thus, the least significant character (3) from the item on the left side is applied uncomplemented from MRD 80 (FIG. 6B) through Gs142 (FIG. 6C) to one group of inputs of the adder 202 (FIG. 6D). The least significant character of the item in the right memory is a 4. The number applied from MRR 82 (FIG. 6B) to the adder 202 (FIG. 6D), however, is the nines complement of 4. As explained above, in the excess three code the nines complement of a character is provided at the "0" outputs of a register. Thus a character 5 is applied to the remaining group of inputs of the adder 202 (FIG. 6D).

During $RI_a$, the adder 202 is provided with two character signal combinations, one complemented and the other not complemented. A "0" value for the carry is also provided during $RI_a$, G242 (FIG. 6D) being activated by $RI_a$. A "0" output is provided from the second carry multivibrator 236, however, because of the previous reset signals.

The adder 202 uses only the four least significant bits, which determine the numerical value, of each character. Referring to FIG. 3, one may see that the first adder output pulse ($AOP_1$) is enveloped by $RI_a$ and in turn envelops the first converter output pulse ($COP_1$). The time duration of $COP_1$ in turn envelops $tp_2$. This time relationship insures that the adder 202 (FIG. 6D) is on only during the period that input signals are provided to it, that the converter 204 is activated only while the adder 202 is activated, and that the output of the converter 204 is used only during the time the converter 204 is activated. The time relationships further prevent transient effects occurring at the beginning and end of pulses from affecting the result of an operation.

The output of the adder 202 is the excess three code equivalent of decimal eight. The five bit adder 202 output is provided during $AOP_1$ to the converter 204 which, during $COP_1$, provides a four bit output. The converter 204 may also provide a carry signal, on the separate carry output, but no carry signal results here from the conversion of the result character eight.

The four bit output of the converter 204 represents the four least significant binary digits of the result character. The next two most significant digits are added to the output of the converter 204 from G249. It will be recalled that numbers in the code chosen here as an example are of the form 01 XXXX (where X is a bit value). Because a signal represents a binary "1," and because the $2^4$ bit is one and the $2^5$ bit is zero in the chosen code, the proper six bit character (without a parity bit) is recreated by the additoin of the output of G249. The $2^5$ bit channel exists but a signal need not be provided in it from G248 at this time.

The augmented converter 204 output is applied to AOR 210 through Gs206. Gs206 is opened under control of G208 during $tp_2$. The converter 204 output, as augmented, sets the binary configuration of the result character into the $2^0$ and $2^5$ bit places of AOR 210.

The $2^6$ bit place of AOR 210 holds the parity bit for the result character. The parity bit is generated by a parity generator 212 from a six bit input comprised of the converter 204 output, the $2^4$ bit output from G249, and the "0" value in the $2^5$ bit channel. Parity generator 212 provides an output or no output, depending upon the sum of the binary "1's" in the character and the parity scheme desired. The parity generator 212 output is provided through G214 (opened by G208 at $tp_2$) to the $2^6$ bit place of AOR 210 at the same time as the other six bits of the character are provided from Gs206.

Thus AOR 210 now holds the character which is the result of the addition of the first characters of the two operands. No carry signal has been provided, so that the first carry multivibrator 232 is not set when G228 is tested at $tp_2$ for the existence of a carry signal.

Each addition step within the addition phase includes a verification procedure in addition to the error check involved in the generation of a parity bit. In generating the parity bit some incorect signal combinations may be detected as described in the above-identified Sublette and Spielberg application. For a more complete check, however, the addition process is again carried out in a different manner during the second part of the RI status level and the results of the two additions are compared.

$tp_5$ marks the beginning of MIC (refer to FIG. 3) in what may be called the second half of the RI status level. During MIC, G224 (activated by RI, A, MIR(1), EACI(0), and MIC signals) opens Gs220 and Gs219. Gs220 couples the $2^0$ and $2^3$ "0" outputs of AOR 210 to the inputs of HSML 50 and HSMR 52 (FIG. 6B). Gs219 (FIG. 6D) couples the $2^4$–$2^6$ "1" outputs of AOR 210 to HSML 50 and HSMR 52 (FIG. 6B). The $2^0$ to $2^3$ bits, which comprise the numerical portion of the character in the illustrated code, are therefore complemented. The $2^4$ to $2^6$ bits, representing parity and specially significant bits, are not complemented. The correct code complement (1) of the stored character (8) is therefore provided to HSML 50 (FIG. 6B). HSMR 52 is inactivated at this time because of the absence of the read-write signal. Because of the address provided to HSML 50, the first numerical character of the result is stored in the result adjacent the previously inserted minus sign. The numerical complement is used for each result character because, as stated above, at this point in time the result is assumed to be negative.

With the start of the MIC signal, the verification procedure is begun. The verification uses the contents of AOR 210 and the results derived from a new addition and complementation of the characters stored in MRL 80 and MRR 82. A timed relationship of signals is once more used to control the passage of information in orderly fashion, similar to the timed relationship described above. Referring now to FIGURE 3, note that with successively shorter durations for the different time pulses, MIC envelops $RI_b$, $RI_a$ encompasses $AOP_2$, and $AOP_2$ encompasses $COP_2$.

During all of MIC G152 (FIG. 6C) is fully activated and opens Gs148. During the same period, G192 opens Gs188. The complement (6) of the character (3) stored in MRL 80 (FIG. 6B) is therefore provided from the "0" outputs of MRL 80 to one set of inputs of the adder 202 (FIG. 6D). The character (4) held in MRR 82 (FIG. 6B) is directed without complementation to the other set of inputs of the adder 202 (FIG. 6D). The "1" value (high level signal) for the carry digit is applied from the "0" output of the second carry multivibrator 236 through G244 to the adder 202. Thus the complements of the bits of the two sets of inputs and of the carry value are applied to the adder.

The adder 202 is activated during $AOP_2$ and provides a five bit output which is the excess three code equivalent of the decimal sum (11) of the three input values (6, 4, and 1). The adder 202 output, applied to the converter 204, results in an output from the converter 204 during $COP_2$. The output is the binary-coded decimal equivalent (one and a carry) of the binary output of the adder 202. The converter 204 output is directed to one side of the adder comparator 246. Note that the converter 204 output is the nines complement of the previous converter 204 output (8). $2^4$ and $2^5$ bit values are provided during $RI_b$, these values being the complements (0 and 1, respectively) of the $2^4$ and $2^5$ bit values previously inserted during $RI_a$. No signal is needed for the $2^4$ bit. The $2^5$ bit value is provided from G248 to the adder comparator 246.

The parity generator 212, which at this time is responsive to the output of the converter 204 and the output of G248, provides a signal value which is the complement of the previous parity bit value. The "0" output from the first carry multivibrator 232 is coupled to the same side of the adder comparator 246 as the complemented result character. The "1" output of the first carry multivibrator 232 is coupled to the other side of the adder comparator 246 along with each of the outputs from AOR 210. The function of the adder comparator 246 is to compare the complemented character and complemented carry on one side with the output of AOR 210 and the uncomplemented carry on the other side. The use of this arrangement of inputs with the comparator described in the application of Cheilik referred to above may permit elimination of some of the components used in the Cheilik arrangement. The fourteen outputs of AOR 210 may be used instead of the pulse transformers shown therein to generate, for example, "a" and "not-a" signals on one side. Note that the signal pattern provided by complementing should, if again complemented by proper coupling at the comparator 246, match the signal pattern provided during the original addition. If the complemented values obtained during $RI_b$ do not have the proper relationship to the values stored in AOR 210 during $RI_a$, the adder comparator 246 will fail to provide an equality signal. The presence of an equality signal, however, gives a positive check on the correctness of the addition. The adder comparator 246 is activated by $tp_7$, which occurs only within $COP_2$.

Thus errors occurring in the addition, conversion, or translation of information during an RI cycle may be detected within the same RI cycle by a simple new manipulation of the information involved.

At $tp_{8s}$ the first RI status level is concluded and an RO status level is entered. The first RO status gate 358 (FIG. 4) is fully activated (by RI, A, EOBO(0), and $tp_{8s}$ signals), and provides an output which sets the RO multivibrator 316 to provide the RO status level signal.

The fourth phase of the operation includes the RO sequence, in which the next characters to be used are selected from the memories and provided for the addition. On beginning the RO sequence the A counter 10 (FIG. 6A) staticizes the address of the 2 from the operand (423) stored in HSML 50 (FIG. 6B). The B counter 12 (FIG. 6A) staticizes the address of the 1 from the operand (14) in HSMR 52 (FIG. 6B). The C counter 14 (FIG. 6A) provides the address of the next to least significant numerical character of the result.

$tp_1$ of the RO status level sequence is employed to reset a number of components of the system. At $tp_1$, G84 is fully activated and resets MRL 80; likewise, G88 resets MRR 82. G216 (FIG. 6D) provides an output to reset AOR 210, erasing the previous result stored in AOR 210. The second carry multivibrator 236 receives a reset impulse from G238, but is not affected at this time because already reset.

At $tp_1$ also, G36 (FIG. 6A) opens G*s*32 and G*s*34. A counter 10 and B counter 12 thus provide addresses for HSML 50 and HSMR 52 (FIG. 6B), respectively.

$tp_2$ starts the MOC signal (refer to FIG. 3). $tp_2$ itself activates G18, advancing A counter 10 (FIG. 6A) by one count. B counter 12 is advanced one count at $tp_2$ by G22. The carry signal stored in the first carry multivibrator 232 (FIG. 6D) is used at $tp_2$ to set the second carry multivibrator 236 through G234.

The MOC pulse activates G78 (FIG. 6B), opening G*s*74 and G*s*76 and placing the address character from HSML 50 into MRL 80, and the address character from HSMR 52 into MRR 82.

The addresses provided to the memories are held by the memory throughout the RO sequence. When, therefore, G102 opens G*s*100 and G106 opens G*s*104 at $tp_6$, the characters in the registers 80 and 82 are returned to the locations in the memories 50 and 52 from which the characters were read. Note that at $tp_6$ G126, G128, G180, and G182 in FIG. 6C are tested to determine if space or item separator symbols have been detected. In the given example these special symbols are not present at this time.

At $tp_{8s}$ in the RO status level, the second RI gate 354 (FIG. 4) is fully activated by (A, EOBO(0), RO, and $tp_{8s}$ signals). Therefore at $tp_{8s}$ the second RI gate 354 sets the RI multivibrator 314 to provide the RI status level signal.

The operation is now continued with the two characters (2 and 1) stored in the registers. The process is similar to the RI sequence described above and will not be repeated in the same detail. In the first part of the RI sequence HSML 50 (FIG. 6B) is addressed with the location at which the result character is to be placed, and the C counter 14 (FIG. 6A) and the E counter 16 are advanced one count. The selected character (2) from the left side is read without complementation into the adder 202 (FIG. 6D). At the same time, the character (1) held in the right register is provided after complementation (to an 8) to the adder 202. The carry signal, if any, from the second carry multivibrator is also provided, uncomplemented, to the adder 202.

The adder 202 provides the sum (10) of the three separate inputs to the converter 204. The converter 204 in turn provides a carry signal to set the first carry multivibrator 232 and a four bit zero output for AOR 210. The four bit output of the converter 204 is augmented by the $2^4$ and $2^5$ bit values, and by the $2^6$ (parity) bit value when placed in AOR 210.

In the second part of the RI sequence the character (0) held by AOR 210 is delivered, after complementation to a nine in the chosen code, to the selected location in the left memory.

The verification of the character held in AOR 210 with the result of a second addition using complementary values is repeated in the manner described above. The complementary values of the characters and of the carry signals are provided to the adder 202, and through the adder 202, to the converter 204. The complementation pattern is employed in the augmenting bits as well as in the output of the converter 204. The full seven bit complemented character, plus the complemented carry, is used to verify the AOR 210 output, with uncomplemented carry. The existence of the proper relationship is determined and signalled by the adder comparator 246.

The second RI status level ends as did the first, at $tp_{8s}$, with a transition to an RO status level. At $tp_{8s}$, the first RO status gate 358 (FIG. 4) is fully activated and sets the RO multivibrator 316 to provide the RO status level signal.

The second RO sequence now undertaken prepares for the addition of a 4 (from 0423 in the left side) to a space symbol (from Sp 14 in the right side). Together with preparation for addition, the second RO sequence includes recognition of the end of the shorter item.

At $tp_1$ MRL 80 (FIG. 6B) is reset from G84; MRR 82 is reset from G88, and AOR 210 (FIG. 6D) is reset from G216.

G*s*74 and G*s*76 (FIG. 6B) are opened by G78 on the MOC signal, applying the 4 from HSML 50 to MRL 80 and the space from HSMR 52 to MRR 82. The memories were addressed at $tp_1$ by the coupled A and B counters 10 and 12 (FIG. 6A), and the A and B counters 10 and 12 are advanced at $tp_2$ by G18 and G22, respectively. The carry stored in the first carry multivibrator 232 (FIG. 6D) sets the second carry multivibrator 236 through G234 at $tp_2$.

Following MOC, the characters held in the registers 80 and 82 (FIG. 6B) are returned to the memories 50 and 52, respectively at the locations from which they were read. As described above, G*s*100 and G*s*104 are opened at $tp_6$ to accomplish this return or regeneration of characters. The existence of a space symbol in the register MRR 82 (FIG. 6B) is detected by the Not Space recognition gate 164 (FIG. 6C) and coupled inverter 170. The Space symbol detected signal provided from I170 sets ISPR 174 through G180 at $tp_6$. ISPR 174 therefore indicates the presence of a space symbol on the right side.

For purposes of addition, the space symbol has no numerical value. Accordingly, at $tp_8$ a 3 (0 in the excess three code) is written into MRR 82 (FIG. 6B) from G96 through delay 98. The zero numerical value thus stored in MRR 82 may be said to be written over the previously stored space character. Note again that a 3 in pure binary code is a zero in the excess three code and may be added to provide the correct result.

At $tp_{8s}$, which closes the second RO sequence, the second RI gate 354 (FIG. 4) is again fully activated and sets the RI multivibrator 314 to provide an RI status level signal.

A third RI sequence is now undertaken to add the values stored in the registers and to verify the process of addition. As in the operations described above, the first part of the RI sequence includes the addition of the characters and the retention of a sum character in AOR 210 (FIG. 6D). The characters supplied to the adder 202 are a 4 (uncomplemented), a 9 (a complemented zero), and a carry (1). The sum provided by addition and conversion is 4 plus a carry. The four bit output of the converter 204 is augmented and placed in AOR 210 as a full seven bit character. During the first part of the RI sequence C counter 14 (FIG. 6A) and E counter 16 are also advanced one count.

In the second part of the third RI sequence the 4 stored in AOR 210 (FIG. 6D) is complemented to a 5 and placed in HSML 50 (FIG. 6B), adjacent the previous result character. The addition is verified by the complementation procedure described above and if error has not occurred the equality signal is provided from adder comparator 246.

HSML 50 (FIG. 6B), at this point in time holds the following result:

591Mi

The desired result is +409, obtained by adding +423 and −14. Note that if an end-around-carry is added to the above provisional result (−591) and if the nines complement of each of the characters in the result is taken, the correct result (+409) is obtained. The operation continues until this correct result is provided.

At $tp_{8s}$ in the RI cycle, the RI status level is terminated and another RO status level is entered, because the first RO status gate 358 (FIG. 4) is fully activated. The RO status level now undertaken determines that numerical characters in both operands have been exhausted.

The RO status level sequence, previously described, is repeated. In this instance, however, the addressed character in HSML 50 (FIG. 6B) is an item separator symbol, which is read from HSML 50 into MRL 80 and regenerated in HSML 50 while being held in MRL 80. An ISPR(1) signal previously provided on the detection of a space in the right-hand operand, activates G64 to reset the HSMR read-write multivibrator 62, removing the read-write signal from HSMR 52.

At $tp_6$ in the RO status level, G126 (FIG. 6C) is fully activated by the ISS detected signal provided from I118, and by RO and $tp_6$ signals, and sets ISPL 122. At $tp_7$ in the RO status level, the EOBO multivibrator (FIG. 4) is set by the coupled gate. The gate is fully activated because ISPL(1), ISPR(1), RO, and $tp_7$ signals are provided. At the conclusion of the RO cycle, AOR 210 (FIG. 6D) and the second carry multivibrator 236 have been reset, preparatory to an end-around-carry sequence.

Thus at $tp_{8s}$ the system is prepared to start an end-around-carry. The RD status gate 362 (FIG. 4) activates the RD multivibrator 318, providing the RD status level signal. The signals necessary to fully activate the RD status gate 362 show that the end of both operands have been detected, that a carry signal is held, and that an MIL(1) or MIR(1) signal is present. The output of the RD status gate 362 also sets the reset multivibrator (RMV) 19 (FIG. 6A). RMV 19 activates, by its "1" output, the subtract sides of A counter 10, C counter 14, and E counter 16. During subsequent operations, A counter 10 may be returned to a lower count, but A counter 10 is not further employed in the addition.

The RD status level marks the start of the fifth phase of the operation—the revision of the provisional result stored in the memory. The RD status level is employed to return the C counter 14 to the address of the first character of the result. The RD status level is repeated a sufficient number of times to reach the desired count.

At $tp_1$ the end-around-carry indicator multivibrator (EACI) 226 (FIG. 6E) is set. Further steps now proceed in dependence upon this new condition of EACI 226. At $tp_1$ also, ISPL 122, MIL 124, MIR 172, and ISPR 174 (FIG. 6C) are reset. The EOBO multivibrator 352 (FIG. 4) is also reset at this time. These multivibrators are therefore placed in a preparatory condition for starting the fifth phase of the operation.

During the RD status level, $tp_1$ and $tp_5$ signals are applied through G26 and the coupled delay line 28 to the trigger input of the E counter 16 (FIG. 6A). Because the E counter 16 is now in the subtractive state, the count stored in the E counter 16 is reduced by two during each RD status level. Recall now that the E counter 16 started from a count of 000000, and increased through 000001 by one count with each trigger input applied to C counter 14. As the E counter 16 counts down, therefore, the $2^5$ bit value will be zero until the all "1's" state is reached. A change in the $2^5$ bit of E counter 16 from "0" to "1" therefore signifies that the C counter 14 is again at the original address. For each two inputs applied to the E counter 16, two inputs later in time (at $tp_4$ and $tp_8$) are also applied to the C counter 14 through G24. The C counter 14 therefore decreases in count along with the E counter 16. When the $2^5$ bit value from the E counter 16 is "1," the C counter 14 is again at its original count and G24 is disabled. No further inputs are applied to C counter 14 during the RD status level. The employment of a six bit E counter 16 assumes that no more than thirty-two characters have been counted for an item by C counter 14. If a possibility exists that an item may include more than thirty-two characters, the E counter 16 need only have a greater counting capacity.

While the E counter 16 and C counter 14 are counting down, and as long as the $2^5$ bit value from the E counter 16 is "0," the system stays in the RD status level. No status gates in FIG. 4 are activated at the termination of an RD cycle until a $2^5(1)$ signal is provided from the E counter 16. When the original count is again obtained, however, the second RIC status gate 342 (FIG. 4) is fully activated, and provides an output which sets the RIC multivibrator 312 and provides the RIC status level signal. The second RIC status gate 342 output also resets RMV 19 (FIG. 6A). RMV(0) signals then place the C counter 14 again in the additive state.

Subsequent in time to the conclusion of the RD status level (at $tp_{8s}$), and prior to the commencement of the RIC status level, the C counter 14 (FIG. 6A) staticizes the address of the first character of the result in HSML 50 (FIG. 6B). During the forthcoming RIC sequence the minus (Mi) symbol stored as the first character of the result is changed to a space (Sp) symbol (which is the equivalent of a positive sign.

At $tp_1$ in the RIC status level, the address provided by the C counter 14 is applied through Gs38 and Gs40 to HSML 50 and HSMR 52 (FIG. 6B), respectively. Gs38 and Gs40 (FIG. 6A) are opened by G42. Only HSML 50 holds the address, however, because the memory read-write signal provided by the read-write multivibrator 62 to HSMR 52 is cut off at $tp_2$. G68 accomplishes this cut-off by resetting HSMR read-write multivibrator 62 at $tp_2$. At $tp_2$ also, the C counter 14 is advanced by one from G20 to the address of the next character of the result stored in the memory.

The address held in HSML 50 (FIG. 6B) is that of the sign (Mi) of the result. The sign is not read out, but a space symbol is written over the minus from the space write gate (SWG) 70 during the MIC signal. The space write gate 70 is fully activated during the MIC signal, because MIL 124 (FIG. 6C) and MIR 172 were previously reset at RD/$tp_1$ and provide "$o$" outputs during MIC. Thus the sign of the result is effectively changed to the desired positive (Sp) sign.

At $tp_8$ MIL 124 (FIG. 6C) and ISPR 174 are set by the output of G132. The two multivibrators, as shown below, are thereby prepared for the subsequent end-around-carry. At $tp_{8s}$ in the RIC status level the second RO status gate 360 (FIG. 4) provides an output to start an RO status level sequence.

Following the RD and RIC cycles, the EACI multivibrator 226 (FIG. 6D) controls further entry of information into the memories. During RO cycles, G36 (FIG. 6A) is disabled because EACI(0) signals are lacking. G42, however, is fully primed by the output of G43 and AS signals, and provides an output in response to $tp_1$. G42 opens Gs38 and Gs40 at $tp_1$ in the RO cycle, therefore, so that C counter 14 provides the address of the operand which is to be added.

After the desired character has been addressed in the memory, an RO cycle is carried out in the manner described above. Only HSML 50 (FIG. 6B) is employed in the end-around-carry, so that the read-write signal is removed from HSMR 52 following the delivery of the address. The C counter 14 (FIG. 6A) is not advanced during the RO cycle, but holds the same address for selection of the same location during entry of the final result into the memory.

In this first RO cycle following the RD and RIC cycles, the address location in HSML 50 (FIG. 6B) is that of the first numerical character (1) in the provisional result. The value thus selected from the memory is placed in MRL 80. Because ISPR 174 (FIG. 6C) was previously set during the RIC cycle, a numerical value of zero is written into MRR 82 by G96 through delay 98 (FIG. 6B). The character (1) stored in MRL 80 is returned to HSML 50 during the RO cycle, but is subject to later revision.

At $tp_{8s}$ the second RI status gate (FIG. 4) sets the RI multivibrator, commencing an RI status level.

As described above, the RI status level provides the steps of addition, verification of the result character, and placement of the result character in the memory. In the first part of the RI cycle, the unchanged C counter 14 (FIG. 6A) address is applied to HSML 50 (FIG. 6B). Thus HSML 50 is addressed to return the first result character to the same point from which it was taken for final revision. After the memory is addressed, the C counter 14 (FIG. 6A) is advanced one count to the next address location.

MRL 80 (FIG. 6B) holds a decimal 1 value, MRR 82 holds a decimal 0 value, and the second carry multivibrator 236 (FIG. 6D) holds a decimal 1 value for the subsequent addition. The carry value and the 0 value are applied without complementation to the adder 202. The 1 from MRL 80 (FIG. 6B) is complemented, however, before being applied to the adder 202 (FIG. 6D). During $RI_a$ in the RI cycle, G150 is fully activated because an MIL(1) signal is provided. G150 opens Gs148, placing the nines complement of 1, or 8, into the adder 202 (FIG. 6D).

Adder 202 therefore, on summing the 8, the 0, and the carry 1, provides an output of decimal 9. The converter 204 likewise provides an output equivalent to decimal 9 to AOR 210.

In the second part of the RI cycle the complemented values are applied to the adder 202 and converter 204 and compared with the character held by AOR 210 in the adder comparator 246 in the manner described above. The character held in AOR 210 is also provided, without complementation, to the address of the first character of the result in HSML 50 (FIG. 6B). The character in AOR 210 (FIG. 6D) is uncomplemented because EACI 226 is at this time providing a "1" output, so that G222 opens Gs218 and Gs219.

The return of a decimal 9 to the result completes the revision of the first character of the result. The prior determination that the provisional minus placed in the result should have been a space means that the remaining characters should also be complemented, and that a carry, if it exists, should be added.

The RI cycle is completed and another RO cycle is begun at $tp_{8s}$. At $tp_{8s}$ the first RO status gate 358 (FIG. 4) is fully activated and sets the RO multivibrator 316 to provide the RO status level signal.

In the second RO sequence following the RD and RIC sequences, a decimal 9 is taken from HSML 50 (FIG. 6B) and placed in MRL 80. MRR 82 retains the decimal 0 value previously entered. The carry signal previously held by the second carry multivibrator 236 (FIG. 6D) is removed when the second carry multivibrator 236 is reset by G238 at $tp_1$. Accordingly, the quantities provided for addition by MRL 80 (FIG. 6B) and MRR 82 are a decimal 9 and a decimal 0. There is no carry. At the completion of the RO status level ($tp_{8s}$) the system enters another RI status level. Note that the RO and RI status level sequences following the first RO and RI sequences after the end-around-carry are of the same general nature as the first RO and RI sequences. Detailed explanations are therefore omitted.

In the second RI status level following end-around-carry adder 202 (FIG. 6D) is provided with a complemented 9, or 0, from the left side and a 0 from the right side. The resultant 0 sum is placed in AOR 210, verified and written in as the second numerical character of the result. At the time of the writing in to HSML 50 (FIG. 6B) the memory holds the following item:

509Sp

Only the most significant character in the above result now need be changed. The change is effected by a third RO sequence and a third RI sequence. These two sequences are entered in order, the condition of the status gates of FIG. 4 being repeated in the same order as in the first RO and RI sequences.

In the third RO sequence following the RD and RIC status levels the five stored in HSML 50 (FIG. 5B) in complemented (to a 4) and added to the 0 value provided by the right side. The addition takes place during the RI status level, during which sequence also the 4 is placed in the memory. Thus the correct numerical result of 409Sp is obtained.

A final RO status level is entered at $tp_{8s}$ of the third RI status level. The memory holds a blank (Sp) adjacent to the last character of the result. The Sp symbol is placed in MRL 80 (FIG. 6B) and also returned to the point from which it was taken. The Sp staticized by MRL 80 is recognized at the Not Sp recognition gate 110 (FIG. 6C) and an Sp detected signal is provided by the coupled inverter 116. At $tp_6$ G128 provides an output which sets ISPL 122.

The system is now ready to signal that the operation has been completed. In the status level gates in FIG. 4 the EOBO multivibrator 350 is set by the output of the coupled gate G350, which is fully activated by ISPR(1), ISPL(1), RO, and $tp_7$ signals. At $tp_{8s}$ the first IC gate 364 is in turn fully activated by AS, first carry (0), EOBO(1), and $tp_{8s}$ signals. The first IC gate 364 output sets the IC multivibrator 320 and provides the IC signal.

Thus the correct and desired result has been determined and placed at the selected locations in the desired memory. The above example has been given as an illustration of a situation utilizing the greatest number of the features of the system. Understanding this example, one may note that most other possible relationships between two operands will result in simpler or shorter operations. As is explained below, no matter what the operands given, the arrangement will provide the correct result.

*X. Other System Operations*

A simple example of how the system works occurs in the addition of two positive operands. With such operands complements are not used except in the verification of the addition. The minus multivibrators, MIL 124 (FIG. 6C) and MIR 172 are not set, and the uncomplemented characters are therefore provided to the adder 202 (FIG. 6D). Signals which would set the minus multivibrator are not provided because the Not Minus recognition gates 114 and 160 (FIG. 6C) are not activated; there is no EACI(1) signal for G132 and G178, and there is no subtraction signal for G134 and G186.

The arrangement of the system makes possible an extremely simple operation when one operand is to be subtracted from another operand. The sign of the subtrahend does not materially alter the sequence employed. If a positive operand is to be subtracted from another positive operand, for example, the subtrahend should, in effect, be treated as a negative number. If a subtrahend is a negative quantity the subtrahend should be treated as a positive number for purposes of the subtraction operation. The location of the subtrahend is indicated by the value of the *c* bit ($c(0)$ meaning that the subtrahend is on the left side), as stated above. The value of the *c* bit is employed during the first RIC cycle to reverse the state of one of the minus multivibrators MIL 124 and MIR 172. If a minus sign has previously been stored in the minus multivibrator, therefore, the multivibrator is switched to a "0" output so that the system operates as with a positive quantity. Conversely, with a positive quantity the minus multivibrator is set for the first time by the output of the coupled G134 or G186. Note that after the first RIC cycle the system may enter an end-around carry operation. Following end-around-carry all steps are those of addition, so that only an A signal is provided. Accordingly, after an RD cycle G134 and G186 are not operated.

As is now understood, the nature of the arrangement is such that reversal of the state of a minus multivibrator will, without more, condition the arrangement for addition or subtraction, as desired. The same units are employed in successive steps, but in different fashions.

Another addition situation which may be encountered is the addition of a negative operand on the left side to a positive operand on the right side. The detailed example given effectively covers this situation, because the arrangement operates the same without regard for the position of addend and augend. So far as minus signs are concerned, the system operates symmetrically. When both operands are negative quantities and the operation is to be addition, no complementation is needed but the sign of the result should be negative. In this situation the minus symbol is first stored as the sign of the result and the minus multivibrators are then reversed. Thus the operation is completed as the addition of two positive quantities. For this purpose G136 (FIG. 6C) recognizes the desired situation of coincidence of RIC, MIL(1), and MIR(1) signals, and provides an output at $tp_7$. The output of G136 applied through delay line 138, resets MIL 124 and MIR 172.

Other subtraction situations are properly disposed of because of the arrangements described above. The system provides for recognition of the sign of an operand and recognition of the operation which is to be carried out. The characters of the operand are complemented or not complemented depending upon the mathematical requirements of the situation. Handling of the operands then proceeds from status level to status level, with an end-around-carry being performed where necessary.

An end-around-carry occurs when it is necessary to replace the excess 1 derived from nines complementing a number. This is the course described above in connection with nines complementing. When only one complementation is carried out, the excess 1 may be replaced or accounted for in some manner. In the detailed example given above one operand is complemented before addition and a provisional minus is presumed for the result. The result was actually positive, however, and the end-around-carry was provided. Clearly, no end-around-carry will be involved when adding two positive numbers or two negative numbers or subtracting a negative number from a positive number. In these cases the result is, in absolute value, merely the sum of the two operands.

If the provisional minus assumed when only one of the operands is negative is actually correct, no end-around-carry is, or need be, made. For example, if the two following operands are to be added, the process is as follows by ordinary addition:

$$\begin{array}{r} 423\ \text{Sp}=+423 \\ 506\ \text{Mi}=\underline{-506} \\ -83=\text{Sum} \end{array}$$

The equivalent operation carried out with the system described here is as follows:

423 Sp=423
506 Mi=$\underline{493}$ (Complemented)
$\overline{916}$−=Sum
916−(Complemented)=083−=Final sum.

As shown above, the operation proceeds by taking the nines complement of each character of the negative operand (506), assuming a negative result, adding the two operands, and placing the complement of each result character in the sum. The final result is a negative quantity. The end-around-carry is not needed in this situation because the negative quantity exceeds the positive quantity in absolute value, and because the two nines complementing operations have in effect cancelled each other.

The above constitute the various numerical relationships which may occur in arithmetic operations. A further situation may be encountered, however, in which there may be no numerical characters in either of the two operands. To detect this special situation, the second IC gate 366 is employed in the status control circuits of FIG. 4. ISSL and ISSR signals, provided in the manner described above, prime the second IC gate 366. If these signals are provided during an RD cycle, in which the system is searching for numerical characters in the operands, the significance is that the operands have been exhausted without numerical characters having occurred. Therefore an IC signal is provided by setting the IC multivibrator 320.

*XI. Conclusion*

The features and advantages of this invention are numerous and will be apparent to those skilled in the art. A few of the features are pointed out below by way of example.

The two operands, whether addend or augend or minuend or subtrahend, can be distributed between the two memories as desired. That is, the addend may be in either of the two memories, with the augend in the other. Similarly, the subtrahend may be in either of the two memories with the minuend in the other. The result can be placed in either of the two memories. The flexibility in placement of information thus provided permits ease of programming and increases the speed of operation of the system.

Note that in the sequence of steps provision is made for returning information to the locations from which derived.

By coupling other signals to the gates and multivibrators shown, the units of the system may be employed in other operations, such as multiplication and division. For this reason the signals designated AS have been included although they are unnecessary if the arrangement is to be used only for addition and subtraction.

Operands may be provided from the memories without special provision being made for their disposition within the memories. The arrangement proceeds through special symbols until the least significant characters of each operand are found. These characters are then matched together and operated on as desired. Prior to addition or subtraction the signs of the operands are detected and utilized for control purposes. Thus items of variable, non-standard maximum length can be manipulated without the employment of extensive recognition and control equipment. The integrated nature of the arrangement permits the proper disposition of the various relationships of sign without the requirement of complicated external programming techniques.

The operation may be further summarized again, as follows:

(1) Rule for determining the sign of the sum.

A search for the least significant digits of the operands takes place. During this search the signs of the operands are recognized and according to the following rules a Space or Minus is recorded in the memory before the addition takes place.

(A) Before a possible end-around-carry.

(*a*) If both operands have the same sign record the common sign.

(*b*) If the operands are of different signs record a minus sign.

(B) After an end-around-carry.

The existence of the end-around-carry indicates that the sum is positive and hence it is necessary to go back and write a space over the minus which had previously been recorded.

(2) Rules for complementation.

Case I. Both operands have the same sign. No complementation of the digits of either operand occurs.

Case II. The signs of the operands are not the same.

(A) Before a possible end-around-carry.

Complement the digits of the negative operand and complement the sum digits.

(B) If an end-around-carry does occur, the digits of the complemented sum are complemented and added to the end-around-carry. This final sum is stored without further complementation.

(3) End-around-carry is recognized by the following conditions:

(*a*) The operands are of unlike signs.

(*b*) The addition of digits has been exhausted.

(*c*) A carry remains.

The rules for subtraction are the same as those for addition with the following exception: When the least significant digits of the operands have been found and the signs of the operands recognized, the sign of the subtrahend will effectively be changed when the correct complementation scheme is set up.

By the employment of a provisional minus sign where the result may be a positive or negative quantity, the system provides a unique method of determining the need for and for effecting end-around-carry. Considerable saving of equipment is made by utilizing the equipment already available.

Thus there has been provided a system for high speed addition and subtraction of variable, non-standard maximum length items. The system recognizes the relationships occurring between operands, and uses the relationships to control its own operations in arriving at a correct result. Timed sequences of events take place, each in orderly fashion. During the course of operations results are verified before being place in a desired location.

What is claimed is:

1. A system for adding two operands or subtracting one operand from another, each of said operands comprising a train of uncomplemented successively presented characters, each of said characters consisting of signals representing a plurality of bits, including special sign characters, said system comprising means to recognize the sign character of each of said two operands before presentation of other characters of each operand, means responsive to said recognizing means selectively to complement the characters of one of said operands as presented, adder means responsive to said selective complementing means and said characters to provide an arithmetic result, means responsive to said adder means and to said recognizing means selectively to complement the output of said adder means character by character whenever the signs of the operands are unlike thereby to provide a result, and means responsive to said adder means and said recognizing means selectively again to complement said result successively character by character by said complementing means.

2. A system for adding two operands or subtracting one operand from another, each of said operands comprising a train of uncomplemented characters, each of said characters consisting of simultaneous signals representing a plurality of bits, and including a variable, non-standard succession of numerical characters preceded by a special character having sign significance, said system comprising means to provide said operands by successive paired characters, least significant character first, means to staticize said paired characters in the same succession, means responsive to said staticizing means when staticizing special characters for providing conditioning signals in a predetermined pattern, gating means responsive to said conditioning signals and to said staticizing means selectively to complement said operands, adder means responsive to said selective complementing means to provide arithmetic result characters, means responsive to said adder means and to said conditioning signals selectively to complement the output of said adder means whenever the signs of the operands are unlike, and means responsive to said adder means and said conditioning signals selectively to revise by complementing a result provided by said complementing means.

3. A system for adding two operands or subtracting one operand from another, said operands being of variable, non-standard maximum length, each of said operands comprising binary coded decimal characters in excess three code and each including numerical characters, and having special sign characters adjacent and preceding the least significant numerical characters, each of said characters consisting of signals representing a plurality of bits, said system comprising storage means to provide paired characters from the two operands, means to staticize said paired characters, means responsive to said staticizing means to recognize said special characters, means responsive to said recognizing means to provide conditioning signals in a predetermined pattern, adder means for providing binary coded decimal result characters with carry, complementing means, first gating means coupled to said staticizing means and responsive to said conditioning signals for selectively applying characters to said complementing means and thence to said adder means, carry storage means responsive to said adder means for applying carry signals resulting from one adder addition of a pair of characters to the next successive adder addition, output register means responsive to said adder means for staticizing said result characters, second gating means responsive to said recognizing means and to said conditioning signals and coupled to said output register means selectively to provide said result characters complemented one by one by said complementing means and uncomplemented result characters to said storage means from said output register means as a provisional result, said second gating means operating to provide a provisional minus result when the sign of the result is dependent upon the values of the operands, result addressing means coupled to said storage means, means responsive to said conditioning signal providing means, said recognizing means, and said carry storage means for recognizing and signalling an end-around carry situation, and control means responsive to said end-around-carry signalling means and coupled to said result addressing means and said second gating means for complementing a provisional result.

4. A system for adding two operands or subtracting one operand from another, said operands being of variable, non-standard maximum length, each of said operands comprising a train of binary-coded decimal characters in excess three code and each including numerical characters, special sign characters adjacent and preceding the least significant numerical characters, and special terminating characters adjacent the most significant numerical characters, each of said characters consisting of signals representing a plurality of bits, said system providing timing signals and comprising first and second storages respectively for holding said respective operands and one of said storages for holding the result of an operation on said operands, operand addressing means for each of said storages, result addressing means selectively coupled to said storages, means responsive to timing and sequence control signals and coupled to said storage and said operand addressing means to provide paired characters from said operands, means respectively to staticize said paired characters, means responsive to said staticizing means and to timing and sequence control signals to return said characters to their respective operand addresses in said storage means, means responsive to said staticizing means to recognize said special characters, means responsive to said recognizing means and to timing and sequence control signals to provide conditioning signals in a predetermined pattern, said conditioning signals indicating the presence of said special sign and terminating characters, an adder for providing binary result characters, converter means responsive to said adder for providing binary-coded decimal result characters with carry, complementing means, a first plurality of gating means responsive to said conditioning, timing, and sequence control signals for selectively coupling the outputs of said staticizing means through said complementing means to said adder, thereby selectively to provide complemented and uncomplemented characters to said adder means, carry storage means responsive to said converter means and said timing and sequence control signals for applying delayed carry signals to said adder, output register means responsive to said converter means for staticizing said result characters, a second plurality of gating means responsive to said conditioning, timing, and sequence control signals for selectively coupling the outputs of said output register means to said one result holding storage, thereby selectively to provide complemented and uncomplemented result characters to said storage means, said second gating means operating to provide a provisional complemented minus result when the sign of the result is dependent upon the values of the operands, and means including a plurality of coincidence gates responsive to said recognizing means, said carry storage means, and said conditioning signal providing means for providing said sequence control signals in predetermined patterns to effect predetermined sequences, including selective end-around-carry with complementation through said complementing means of characters of said provisional result.

5. A system for adding two operands or subtracting one operand from another, said operands comprising binary-coded decimal characters serially presented and each operand including special sign characters, preceding the other characters, ecah of said characters consisting of signals representing a plurality of bits, said system comprising a complementing means, adder input means responsive to said sign characters for selectively complementing said operands character by character in said complementing means, adder means responsive to said adder input means, result storage means, adder output means responsive to said adder means and said sign characters for selectively complementing the adder output character by character to provide a provisional result and to apply said provisional result to said result storage means, and means responsive to said sign characters and said adder means and selectively coupling said result storage means through said complementing means to said adder input means selectively to provide the complement, character by character, of said provisional complemented result to said adder means as an operand.

6. A system for adding two operands or subtracting one operand from another, said operands comprising successively presented binary-coded decimal characters and including special sign characters preceding said operands, each of said characters consisting of signals representing a plurality of bits, said system comprising means to provide said operands by paired characters, complementing means, adder input means responsive to said operand providing means and to said sign characters for complementing, only when said sign characters differ, in said complementing means the non-special characters of said operands as presented, adder means responsive to said adder input means for providing binary-coded decimal result characters, result storage means, adder output means responsive to said adder means and said sign characters for providing when, and only when, said sign characters differ, a provisional result operand by complementing said adder output, in said complementing means, said adder output means being coupled character by character, to said result storage means, and means responsive to said sign characters and said adder means for selectively coupling said result storage means to said adder input means for selectively providing said provisional complemented result to said adder means as an operand, character by character, for end-around-carry and complementation in said complementing means of said provisional result.

7. A system for adding two operands or subtracting one operand from another, each of said operands including a train of uncomplemented numerical characters in an excess three code and having a special sign character preceding said numerical characters, each of said characters consisting of signals representing a plurality of bits, said system comprising first multivibrator register means for staticizing said characters, recognition means responsive to special sign characters staticized by said first multivibrator register means, bistable conditioning signal providing means responsive to said recognition means, a character adder, complementing means, a plurality of input gating means selectively coupling the outputs of said first multivibrator register means to said character adder and responsive to said conditioning signals selectively to provide characters complemented by said complementing means and uncomplemented characters to said character adder, second multivibrator register means coupled to said character adder for staticizing the outputs of said character adder, and a plurality of output gating means responsive to said conditioning signals and coupled to the outputs of said second multivibrator register means selectively to provide characters complemented by said complementing means and uncomplemented characters from said second multivibrator register means.

8. A system for adding two operands or subtracting one operand from another, each of said operands including a train of successively presented, uncomplemented numerical characters in an excess three code and having a special sign character preceding said numerical characters and having special terminating characters following said numerical characters, each of said characters consisting of signals representing a plurality of bits, said system comprising first multivibrator register means for staticizing said characters, a plurality of character recognition means individually responsive to special characters staticized by said first multivibrator register means, a plurality of bistable multivibrators for providing steady state conditioning signals in predetermined patterns responsive to said character recognition means, a character adder, complementing means, a plurality of input coincidence gates selectively coupling the outputs of said first multivibrator register means through said complementing means to said character adder and responsive to said conditioning signals selectively to provide complemented and uncomplemented characters to said character adder, second multivibrator register means coupled to said character adder for staticizing the outputs of said character adder, and a plurality of output coincidence gates responsive to said conditioning signals and coupled to the outputs of said second multivibrator register means selectively to provide complemented characters through said complementing means and uncomplemented characters from said second multivibrator register means.

9. An adder for two operands provided as paired trains of characters, least significant character first, the least significant character being preceded by a special sign character, each of said characters consisting of signals representing a plurality of bits, said adder comprising holding means for said characters, means for providing conditioning signals in predetermined patterns responsive to said special sign characters in said holding means, a character adder, complementing means, gating means responsive to said conditioning signals selectively to provide uncomplemented characters and characters complemented by said complementing means from said holding means to said adder, output gating means responsive to said conditioning signals selectively to provide uncomplemented outputs and outputs complemented by said complementing means from said adder, said output gating means operating to provide a provisional minus result whenever the said sign characters of two operands differ, means responsive to said conditioning signals and said adder for detecting and signalling the occurrence of an end-around-carry situation, and means coupled to said conditioning signal providing means and said end-around-carry situation signalling means selectively to complement by said complementing means a provisional minus result.

10. An adder for two operands provided as paired trains of characters, least significant character first, the least significant character being preceded by a special sign character, each of said characters consisting of signals representing a plurality of bits, said adder comprising means for holding said characters, means responsive to special sign characters in said holding means for providing combinations of steady state conditioning signals in predetermined patterns, a character adder, complementing means, a first set of coincidence gates arranged in groups and alternatively primed by said conditioning signals selectively to provide characters and complemented characters from said holding means to said adder, a second set of coincidence gates arranged in groups and alternatively primed by said conditioning signals selectively to provide outputs and complemented outputs from said adder, said second set of gates operating to provide provisional minus result characters whenever the said sign characters of two operands differ, means responsive to said conditioning signals and said adder for detecting and signalling the occurrence of an end-around-carry situation, and means coupled to said conditioning signal providing means and said end-around-carry situation signalling means selectively to revise by complementation the provisional minus result characters.

11. A system for adding two operands comprising memory means for storing and for reading said operands and a result in said memory means, each of said operands comprising a plurality of characters, each character being represented by signals representing a plurality of binary digit signals, a pair of means responsive to said memory means for staticizing said operands, each of said staticizing means staticizing only a single character at a time, a pair of means respectively responsive to said staticizing means for recognizing operand termination and sign, an adder, control network means responsive to said recognizing means, means responsive to said control network means and coupling said staticizing means to the input of said adder to complement one of said operands only when the said signs thereof differ, and means responsive to said control network means and coupling the output of said adder to said memory means to complement the adder output whenever the said operand signs differ and thereby store a complemented provisional result in said memory means.

12. A system for adding two operands or subtracting one operand from another, said operands each consisting of characters and being of variable, non-standard maximum length and each including a precedent sign character, each of said characters consisting of signals representing a plurality of bits, said system comprising memory means for holding said operands and a result, register means responsive to said memory means for staticizing said operands, means responsive to said register means for recognizing the sign characters of said operands and for recognizing when said sign characters differ, means responsive to said register means for recognizing the termination of said operands, a control network responsive to both said recognizing means, and adder, complementing means, first gating means responsive to said control network and selectively coupling said register means through said complementing means to the input of said adder selectively to complement said operands only when said sign characters differ, and second gating means responsive to said control network and coupling the output of said adder through said complementing means to said memory means when and only when said sign characters differ, thereby selectively to complement a result provided to said memory means whenever said operand signs differ.

13. A system for adding two operands having sign and termination indications and in an excess three binary code comprising memory means for holding said operands and a result, memory addressing means selectively storing and reading said operands and a result in said memory means, means responsive to said memory means and said addressing means for staticizing said operands as binary-valued outputs, means responsive to said staticizing means for recognizing the sign of said operands, means responsive to said staticizing means for recognizing the termination indication of said operands, a control network including a plurality of bistable multivibrators responsive to both said recognizing means and providing conditioning signals in predetermined combinations, an adder having at least two inputs for said operands and an output, first gating means responsive to said conditioning signals and coupling the outputs of said staticizing means to the inputs of said adder selectively to complement one of said operands when and only when the sign indications of said operands differ, and second gating means responsive to said conditioning signals and coupled to the output of said adder selectively to complement the adder output when, and only when, the sign indications of said operands differ, whereby a complemented or uncomplemented result is derived from the adder output, and means responsive to said addressing means for storing the said result.

14. A system for adding two operands or subtracting one operand from another, said operands being of variable, non-standard maximum length, and respectively comprising trains of characters in an excess three code, said trains beginning with a distinctive sign character and ending with a distinctive terminating character, each of said characters consisting of signals representing a plurality of bits, said system comprising memory means for holding said operands and a result, addressing means for locating said operands and a result in said memory means, register means responsive to said memory means for staticizing characters provided one by one from said memory means, means responsive to said register means for recognizing said sign characters, means responsive to said register means for recognizing said terminating characters, control network means responsive to both said recognizing means for providing conditioning signals in predetermined patterns, adder means, first gating means responsive to said control network for applying selectively complemented operands from said register means to said adder means, second gating means responsive to said control network for applying selectively complemented results from said adder means to said memory means, and end-around-carry means responsive to said control network and said adder means and coupled to said addressing means selectively to complement a said result character by character as an operand.

15. A system for adding two operands or subtracting one operand from another, said operands being of variable, non-standard maximum length and comprising trains of numerical characters in an excess three code, a special sign character being placed next adjacent the least significant numerical character and a special terminating character being placed next adjacent the most significant numerical character, each of said characters consisting of signals representing a plurality of bits, said system comprising memory means for holding said operands and a result, addressing means for locating said operands and a result in said memory means, bistable multivibrator register means responsive to said memory means for staticizing characters provided one by one from said memory means, means responsive to said register means for recognizing said sign characters, means responsive to said register means for recognizing said terminating characters, control network means comprising a plurality of coincidence gates and a plurality of bistable elements and providing conditioning signals in a predetermined pattern responsive to both said recognizing means, a character adder having at least two inputs and an output, a first plurality of coincidence gates responsive to said conditioning signals for applying selectively complemented characters from one of said register means and non-complemented characters to the inputs of said character adder, a second plurality of coincidence gates responsive to said conditioning signals for applying selectively complemented outputs from said character adder to said memory means to be stored therein as a result, and end-around-carry means responsive to said conditioning signals and said character adder and coupled to said addressing means selectively to employ a said result as an operand and for complementing said result character by character.

16. In a system for operating arithmetically on operands each comprising a sign character followed by binary coded decimal characters in an excess three code, each of said characters consisting of signals representing a plurality of binary digits, an arrangement for adding said characters by pairs or subtracting one of said characters of a pair from the other, said arrangement comprising register means having binary "1" and "0" outputs for each digit of said characters, an adder, input gating means selectively coupling said register means binary "1" and "0" outputs to said adder respectively according to whether said sign characters are alike or unlike, a converter coupled to said adder for providing binary coded decimal result characters, output register means having binary "1" and "0" outputs for each digit of said result characters, and output gating means coupled to the binary "1" and "0" outputs of said output register means for selectively providing complemented and uncomplemented outputs from said output register means respectively depending whether the said sign characters are unlike or alike.

17. In a system for operating arithmetically on operands each comprising a sign character followed by binary coded decimal characters in an excess three code, each of said characters consisting of signals representing a plurality of binary digits, an arrangement for adding said pairs of characters or subtracting one of said characters of a pair from the other, said arrangement comprising bistable register means having binary "1" and "0" outputs for each digit of said characters for staticizing said characters, a binary coded decimal adder having at least two character inputs and an output, a plurality of input coincidence gates selectively coupling said register means binary "1" and "0" outputs to the character inputs of said adder respectively according to whether said sign characters are alike or unlike, a converter coupled to said adder output for providing binary coded decimal result characters with carry, an output bistable register means having binary "1" and "0" outputs for each digit of said characters for staticizing said result characters, and a plurality of output coincidence gates coupled to the binary "1" and "0" outputs of said output register for selectively providing according to whether said sign characters are unlike or alike respectively complemented outputs from said "0" outputs and uncomplemented outputs from said "1" outputs of said output register means.

References Cited in the file of this patent

UNITED STATES PATENTS

| | | |
|---|---|---|
| 2,538,636 | Williams | Jan. 16, 1951 |
| 2,705,108 | Stone | Mar. 29, 1955 |
| 2,761,621 | Wright et al. | Sept. 4, 1956 |
| 2,776,794 | Williams et al. | Jan. 8, 1957 |
| 2,777,635 | Tootill et al. | Jan. 15, 1957 |
| 2,789,760 | Rey et al. | Apr. 23, 1957 |
| 2,797,862 | Andrews et al. | July 2, 1957 |

FOREIGN PATENTS

| | | |
|---|---|---|
| 678,427 | Great Britain | Sept. 3, 1952 |
| 709,408 | Great Britain | May 26, 1954 |

OTHER REFERENCES

Buchholz: The System Design of the IBM Type 701 Computer, Proc. of the I.R.E., October 1953, pp. 1262 to 1275.

Frizzell: Engineering Description of the IBM Type 701 Computer, Proc. of the I.R.E., October 1953, pp. 1275 to 1280.

Ross Jr.: The Arithmetic Element of the IBM Type 701 Computer, Proc. of the I.R.E., October 1953, pp. 1287 to 1293.